(12) United States Patent
Shiraishi et al.

(10) Patent No.: US 6,588,910 B2
(45) Date of Patent: Jul. 8, 2003

(54) IMAGE DISPLAY MECHANISM AND IMAGE DISPLAY DEVICE

(75) Inventors: Mikio Shiraishi, Yokohama (JP); Yasuo Otsuka, Chigasaki (JP); Toru Numata, Yokohama (JP)

(73) Assignee: Hitachi, Ltd., Tokyo (JP)

( * ) Notice: Subject to any disclaimer, the term of this patent is extended or adjusted under 35 U.S.C. 154(b) by 107 days.

(21) Appl. No.: 09/817,027

(22) Filed: Mar. 27, 2001

(65) Prior Publication Data

US 2001/0019397 A1 Sep. 6, 2001

Related U.S. Application Data

(63) Continuation of application No. 09/170,773, filed on Oct. 13, 1998, now Pat. No. 6,231,191.

(30) Foreign Application Priority Data

Oct. 20, 1997 (JP) .............................. 9-287453

(51) Int. Cl.[7] ................................ G03B 4/14
(52) U.S. Cl. ................................... 353/119
(58) Field of Search ............... 353/119, 85, 87, 353/101; 349/5, 58

(56) References Cited

U.S. PATENT DOCUMENTS

| | | | | |
|---|---|---|---|---|
| 5,092,671 A | * | 3/1992 | Van Os | ............... 353/119 |
| 5,313,234 A | | 5/1994 | Edmonson et al. | |
| 5,722,752 A | * | 3/1998 | Maiers | ............... 353/101 |
| 5,860,719 A | | 1/1999 | Suzuki et al. | |
| 5,988,818 A | * | 11/1999 | Fujimori et al. | ............ 353/119 |
| 5,993,008 A | | 11/1999 | Hashimukai et al. | |
| 6,033,077 A | * | 3/2000 | Iwase | ............... 353/119 |
| 6,046,858 A | | 4/2000 | Scott et al. | |
| 6,065,838 A | | 5/2000 | Konuma et al. | |
| 6,226,055 B1 | * | 5/2001 | Koba | ............... 349/5 |
| 6,231,191 B1 | * | 5/2001 | Shiraishi et al. | ............ 353/119 |
| 6,345,896 B1 | * | 2/2002 | Kurosawa | ............... 349/5 |

FOREIGN PATENT DOCUMENTS

| | | |
|---|---|---|
| JP | 62-294230 | 12/1987 |
| JP | 64-5174 | 1/1989 |
| JP | 3-51881 | 3/1991 |
| JP | 7-152009 | 6/1995 |
| JP | 9-096867 | 4/1997 |
| JP | 10-319853 | 12/1998 |

* cited by examiner

*Primary Examiner*—William Dowling
(74) *Attorney, Agent, or Firm*—Mattingly, Stanger & Malur, P.C.

(57) ABSTRACT

In order to prevent dust from sticking to the LCD panel, to prevent the LCD panel from being heated and to suitably adjust the position of the LCD panel, a duct is provided between cooling means for a light source and cooling means for a LCD panel to send cooling air from the LCD panel side to the light source side. Therefore, a light incidence/reflection plane of the LCD panel is disposed in an almost hermetically closed space and an optical path from an integrator lens to the LCD panel is formed in the almost hermetically closed space.

7 Claims, 21 Drawing Sheets

IMAGE DISPLAY MECHANISM AND IMAGE DISPLAY DEVICE

This is a continuation application of U.S. Ser. No. 09/170,773, filed Oct. 13, 1998 now U.S. Pat No. 6,231,191.

BACKGROUND OF THE INVENTION

1. Field of the Invention

The present invention relates to a projection type image display mechanism and a projection type image display device for enlarging an image and projecting the image on a screen by utilizing a light valve element such as a LCD panel.

2. Description of Related Art

A projection type image display device epitomized by a LCD projector, a liquid crystal television, and a projection type display device has been known as a device for enlarging an image on a light valve element and for projecting it on a screen by projecting light irradiated by a light source (lamp and the like) on the light valve element (for example, LCD panel and the like).

As for the projection type image display device, there have been raised problems that a LCD panel and the parts thereof are heated by absorbing light irradiated by the light source and that dust floats in the vicinity of the LCD panel. The extreme heating of the LCD panel and the parts thereof causes a malfunction (in the worst case, broken LCD panel) to the LCD panel, and floating dust in the vicinity of the light incidence/reflection plane of the LCD panel or in particular, the dust stuck to the LCD panel causes the deteriorated quality of the image enlarged and projected on the screen (hereinafter referred to as screen image).

Therefore, in many projection type image display devices, measures have been taken to solve these two problems.

For example, a certain projection type image display device has a cooling unit designed specifically for the LCD panel to prevent the LCD panel from being heated over a predetermined temperature (for example, about 60° C.). This can ensure a normal operation of the LCD panel constituted by optical functional members such as semiconductor drive element, liquid crystal and the like. Further, for example, a light source which produces heat of about 30 percent of the input energy and radiates a large amount of input energy as thermal energy so as to remove light other than visible light (for example, light having a wavelength of 400 nm to 700 nm), that is, ultraviolet light (for example, light having a wavelength of less than 400 nm), or ultrared ray (for example, light having a wavelength of more than 700 nm), usually has a cooling unit designed specifically for the light source, too. The light source produces heat of more than half of the total input energy. In this respect, an air-cooled unit such as an air blowing fan is generally used as the cooling unit because it can be easily operated.

Further, in the image display device disclosed in the Japanese unexamined Patent Publication No. 7-152009, a transmittance type LCD panel is housed in a hermetically closed space so as to prevent dust from entering the vicinity of the LCD panel. Further, to prevent the LCD panel from being heated, air is circulated in the hermetically closed space.

In the image display device disclosed in the Japanese Unexamined Patent Publication No. 64-5174, to improve utilization efficiency of light in a high definition image, a reflection type LCD panel is employed and a reverse plane of the incidence/reflection plane thereof (hereinafter referred to as reverse plane") can be utilized as a radiation plane.

In the image display device disclosed in the Japanese Unexamined Patent Publication No. 62-294230, to more effectively utilize a reverse plane of the reflection type LCD panel as a radiation plane, a cooling unit is provided on the back side of the reflection type LCD panel.

However, since the conventional projection type image display device is provided with an air blowing fan designed specifically for each heating body (a light source and a LCD panel), a sufficient improvement has not been produced in reliability and costs of the device. Therefore, a structure of a cooling mechanism is required to be simplified. Further, the conventional projection type image display device has the problems: if an exhaust port faces a wrong direction, warm air exhausted from the exhaust port is blown over the audience and the screen image become unstable by the unstable air produced in the optical path of the light projected on the screen.

Any of image display devices can not solve both problems that the LCD panel and parts thereof are heated and that the dust floats in the vicinity of the light incidence/reflection plane of the LCD panel. That is, ensuring the reliability of the device and improving the quality of the image can not consist together.

For example, in the image display device disclosed in the Japanese Unexamined Patent Publication No. 62-294230 and in the image display device disclosed in the Japanese Unexamined Patent Publication No. 64-5174, as described above, measures have been taken to prevent the LCD panel from being heated but special measures have not been taken to prevent the dust from floating in the vicinity of the light incidence/reflection plane of the LCD panel. Therefore, there is an extremely high possibility that the shadow of the dust is seen in the screen image. Further, in the image display device disclosed in the Japanese Unexamined Patent Publication No. 62-294230, the whole device is heated but only the LCD panel is locally cooled, which does not produce a sufficient cooling effect. Therefore, the reliability of the whole device can not be ensured.

On the other hand, although the image display device disclosed in the Japanese Unexamined Patent Publication No. 7-152009 intends both to prevent the dust from floating in the vicinity of the light incidence/reflection plane of the LCD panel and to prevent the LCD panel and parts thereof from being heated, it employs a cooling system using air in the hermetically closed space and hence it can not be expected to produce a sufficient cooling effect because in recent years a demand for the intensity of the screen image has increased the amount of heat generated by the LCD panel. Therefore, the reliability of the device is not necessarily ensured.

Further, in many devices of color display type among the projection type image display devices epitomized by a LCD projector, a liquid crystal television, and a projection type display device, the images of color components formed by the light valve means like the liquid crystal are often combined together to make a multicolored image. Therefore, the quality of the colored image enlarged and projected on the screen (hereinafter referred to as screen image) depends to a large degree on convergence performance (convergence adjustment) of converging the positions of the images of color components modulated by the light valves. Therefore, many kinds of techniques relating to a convergence adjustment have been proposed. For example, Japanese Unexamined Patent Publication No. 3-51881 discloses a technique of converging the images by using the convergence adjusting mechanisms provided on the LCD panels of color components. However, in the Japanese Unexamined Patent Publication No. 3-51881, it is not recognized that it is necessary to prevent the dust from floating in the vicinity of the LCD panel and to prevent the LCD panel and parts thereof from being heated.

SUMMARY OF THE INVENTION

It is the first object of the present invention to simplify the inside structure of the device and to improve the environment of the audience without reducing the reliability of a projection type image display device. Further, it is the second object of the present invention to improve the quality of the screen image projected by the projection type image display device. Still further, it is the third object of the present invention to provide a technology for suitably converging the light valve elements.

To accomplish the first and second objects, an image display mechanism according to the present invention is provided with illuminating means, projecting means, reflection type light valve means having a light incidence/reflection plane, and cooling means, wherein the reflection type light valve means and the illuminating means share a part of the cooling means.

In the constitution described above, it is not necessary to provide the light valve and the light source with each air blowing fan as shown in prior art. Therefore, the inside structure of the image display mechanism can be simplified without reducing the reliability thereof. Further, since it is not necessary to provide each heating body with an air blowing fan, the environment of the audience can be improved.

To accomplish the third object, an image display mechanism according to the present invention is provided with illuminating means, projecting means, reflection type light valve means having a light incidence/reflection plane, and almost hermetically closed space shut off from the outside air, wherein the illuminating means illuminates the reflection type light valve means to project light reflected by the reflection type light valve means by the projecting means, and wherein the almost hermetically closed space is constituted by a plurality of structural members and the light incidence/reflection plane of the reflection type light valve means contacts the joints of the plurality of structural members.

Since the LCD panel placed in the almost hermetically closed space is not exposed to the dust of the outside air in the constitution like this, the shadow of the dust is not produced on the screen image.

Further, an image display mechanism according to the present invention is provided with positioning means for supporting the light valve means to position the projected images of color components. Furthermore, the joints of the plurality of structural members constituting the almost hermetically closed space are joined to the light valve means and the almost hermetically closed space.

Still further, the light valve means and the positioning means are disposed outside the almost hermetically closed space shut off from the outside air.

DETAILED DESCRIPTION OF THE PREFERRED EMBODIMENTS

Preferred embodiments according to the present invention will be described below with reference to the drawings.

First, a schematic constitution of a projection type image display device according to the present embodiment will be described with reference to FIG. 1.

Figure 2:
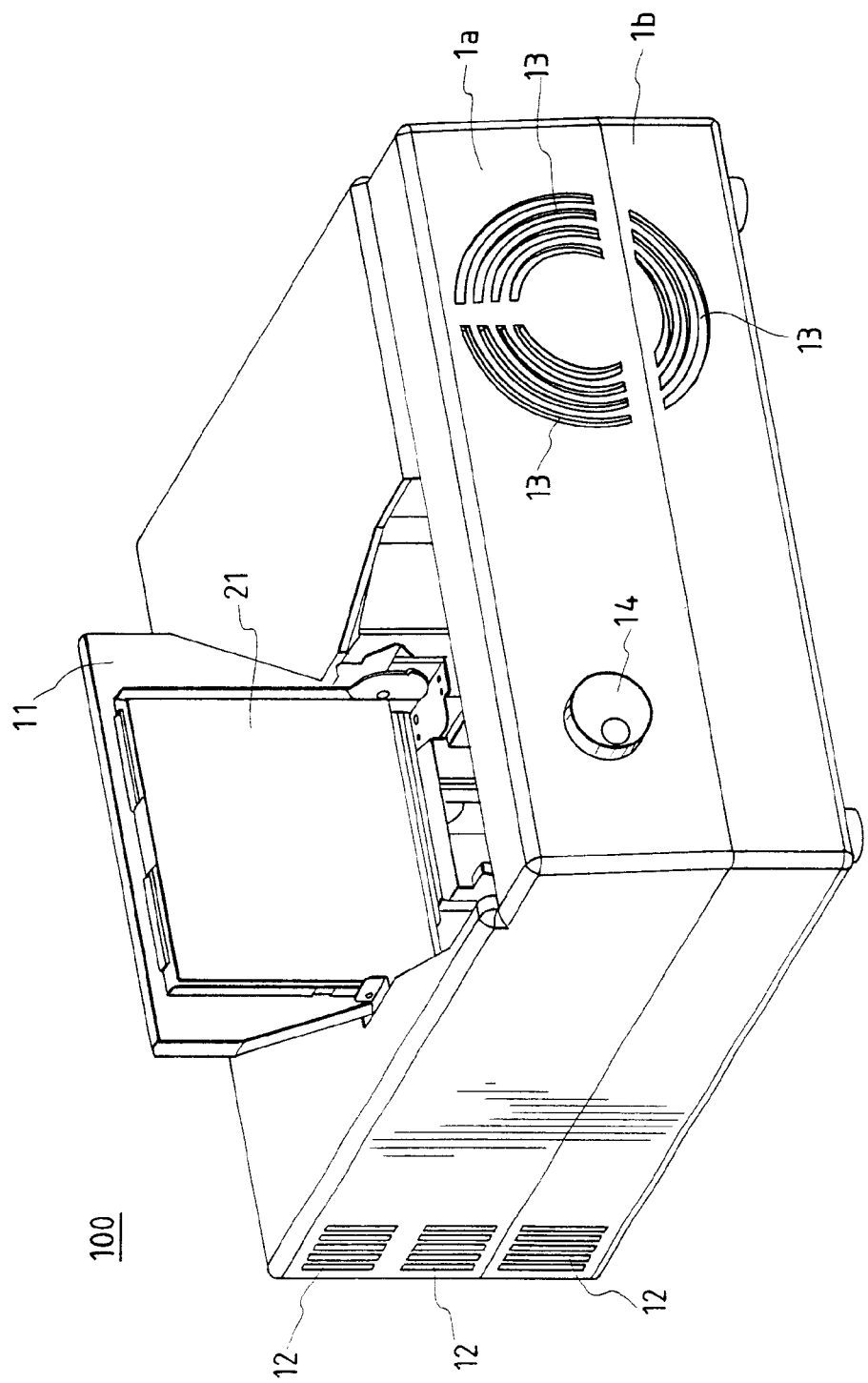
FIG. 2 is an external view of a projection type image display device of the first embodiment according to the present invention when it is used.

In the outer cases 1a and 1b of the present projection type image display device 100, a light source (a lamp in the present embodiment), a reflection type LCD panel and the other optical elements are housed. When the device 100 is used, as shown in FIG. 2, a cover 11 mounted on the upper outer case 1a is opened and only a third mirror lens 21 constituting an optical system is taken out from the outer cases 1a and 1b. In this respect, each of the mirror lenses employed in the present projection type image display device 100 is an optical part having a curved mirror plane (spherical plane or non-spherical plane) for forming an image. Therefore, each of the mirror lenses may be replaced by the other optical element having the same function such as a refractive lens, a combination of a refractive lens and a mirror and the like.

Figure 3:
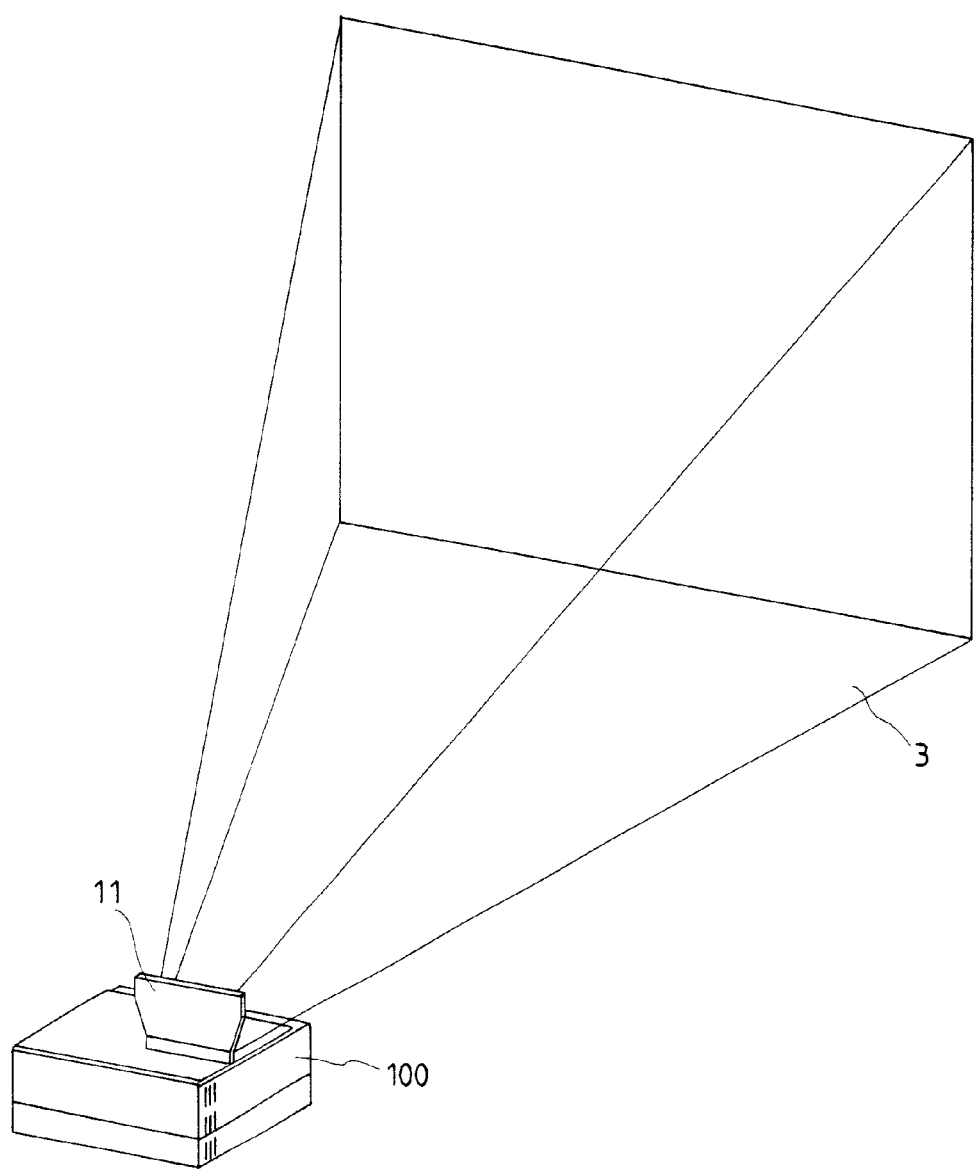
FIG. 3 is a conceptional view of the optical path of light projected from a projection type image display device of the first embodiment according to the present invention.

When the light source is lighted up in this state, as shown in FIG. 3, a light pencil 3 containing image information written in the reflection type LCD panel is reflected by the third mirror lens 21(see FIG. 2) and is projected on a screen. The optical path of the light pencil 3 at this time will be described in detail as follows.

Figure 4:
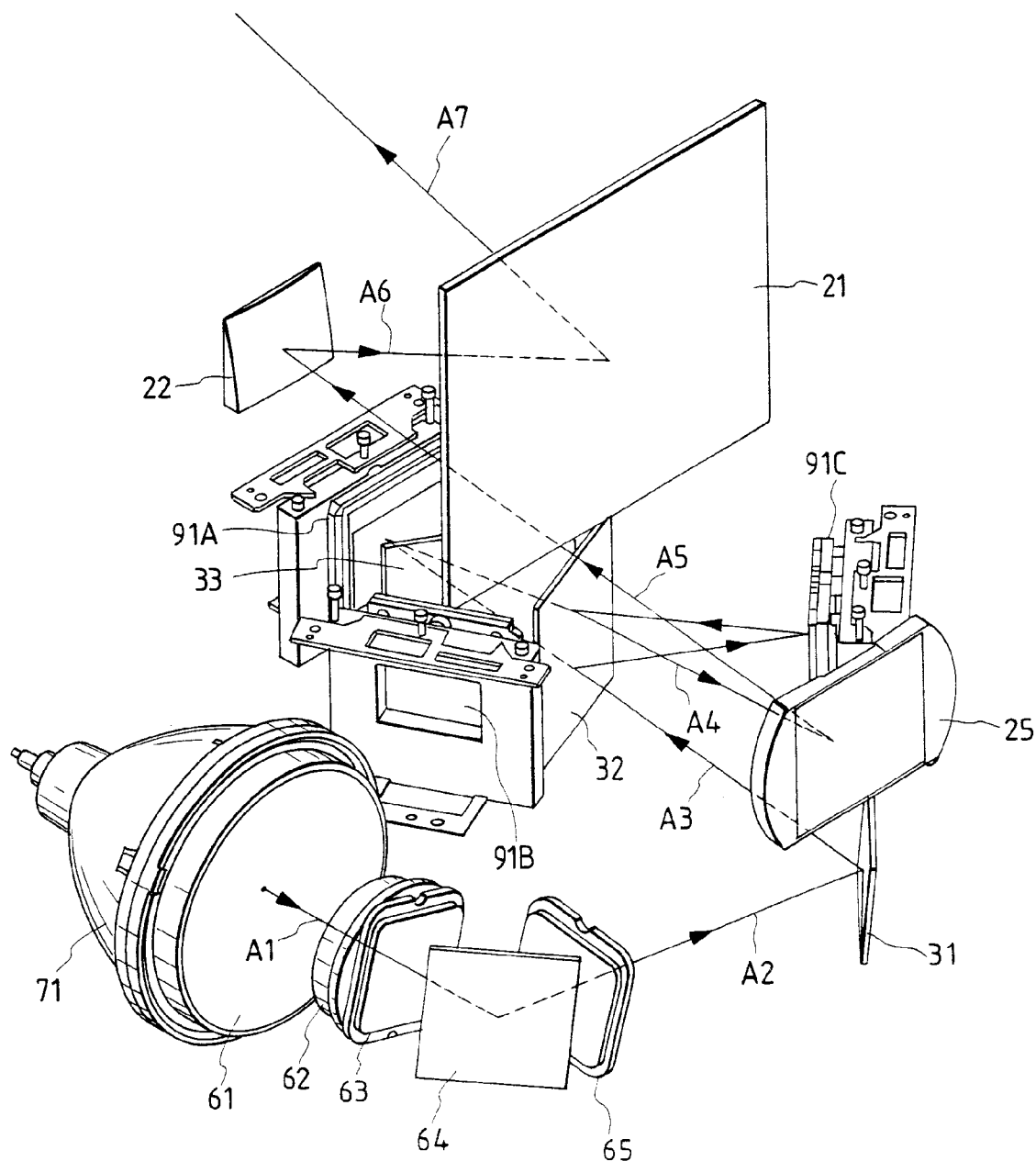
FIG. 4 shows a schematic constitution of an optical system of a projection type image display device of the first embodiment according to the present invention.

As shown in FIG. 4, the light pencil projected from the light source 71 and having a suitable amount of light passes first through an integrator 63 and then is reflected by a mirror 64 and passes through an integrator 65 and is reflected by a mirror 31 and is introduced to two dichroic mirrors 32 and 33. The light pencil separated into color components (for example, red, green and blue color components) by these dichroic mirrors 32 and 33 enters the light incidence/reflection planes of reflection type LCD panels 91A, 91B and 91C for displaying colors at predetermined incidence angles (not zero) and is modulated every picture element by the reflection type LCD panels 91A, 91B and 91C for displaying colors. In this regard, to separate the light pencil advancing from the mirror 31 from the modulated light pencil advancing to the first mirror 25 described below by the reflection by the light incidence/reflection planes of the reflection type LCD panels 91A, 91B and 91C, the light pencil is let on the light incidence/reflection planes of the reflection type LCD panels 91A, 91B and 91C at predetermined incidence angles.

Then, the modulated light pencils reflected by the reflection type LCD panels 91A, 91B and 91C for displaying colors are introduced again to two dichroic mirrors 32 and 33 and are converged into one light pencil by these two dichroic mirrors 32 and 33 and then is reflected by the first mirror lens 25 and then is reflected by the second mirror lens 22 and then is introduced to the third mirror lens 21 taken out outside the outer cases 1a and 1b.

This enlarges the color images written on the reflection type LCD panels 91A, 91B and 91C for displaying colors and displays them on a screen (not shown). In the following description, an optical path A1→A2→A3 from the light source 71 to the reflection type LCD panels 91A, 91B and 91C for displaying colors is referred to as an illumination-side optical path and an optical path A4→A5→A6→A7 from the reflection type LCD panels 91A, 91B and 91C for displaying colors to the screen is referred to as a projection-side optical path.

Figure 1:
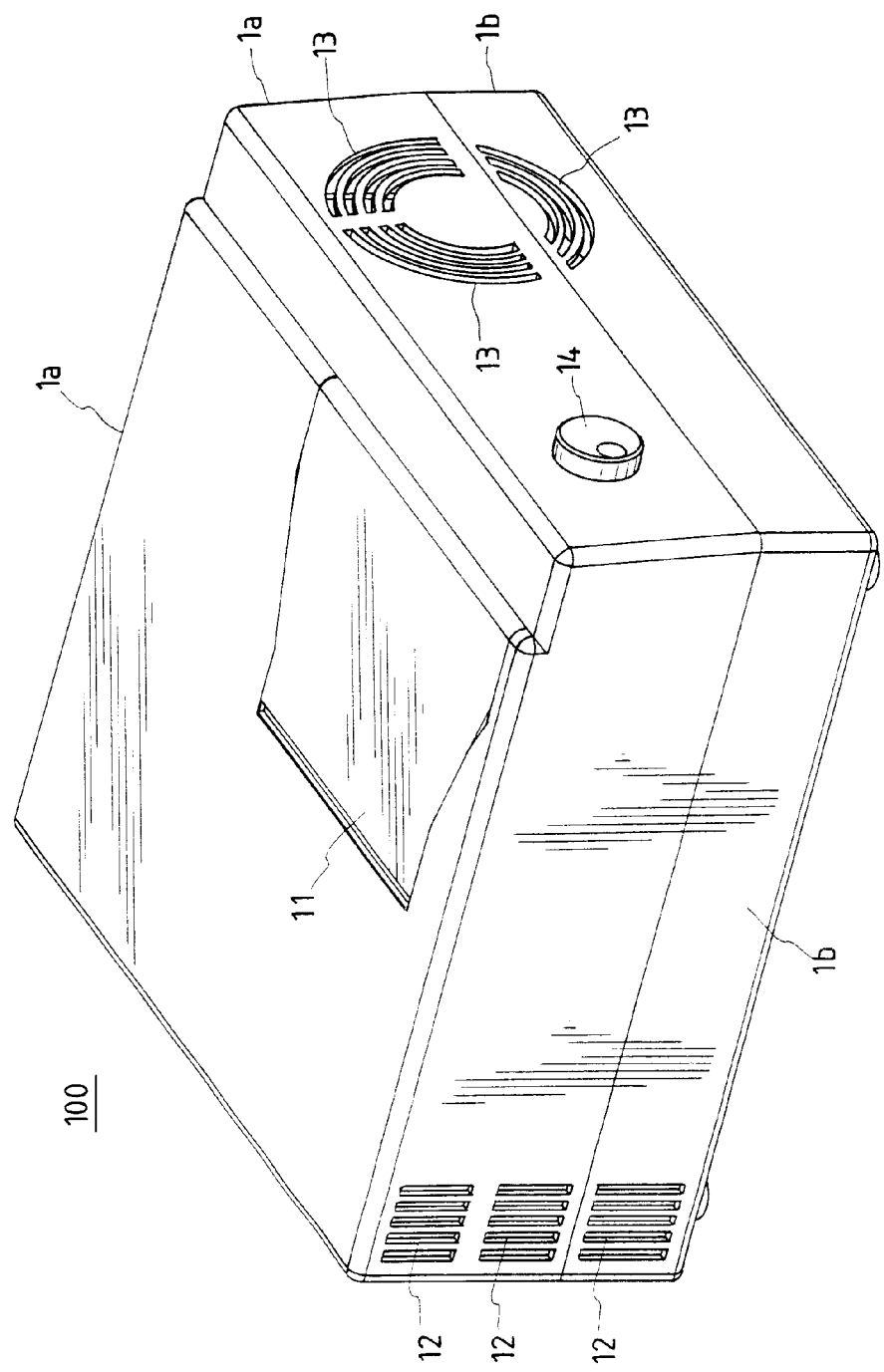
FIG. 1 is an external view of a projection type image display device of the first embodiment according to the present invention.

Further, as shown in FIG. 1 the outer cases 1a and 1b have an intake port 12 and an exhaust port 13 in predetermined regions. In the outer cases 1a and 1b, an exhaust fan is housed opposite to the exhaust port 13. The outside air from the intake port 12 passes through the inside of the outer cases 1a and 1b and goes to the intake port of an optical unit.

Figure 5A:
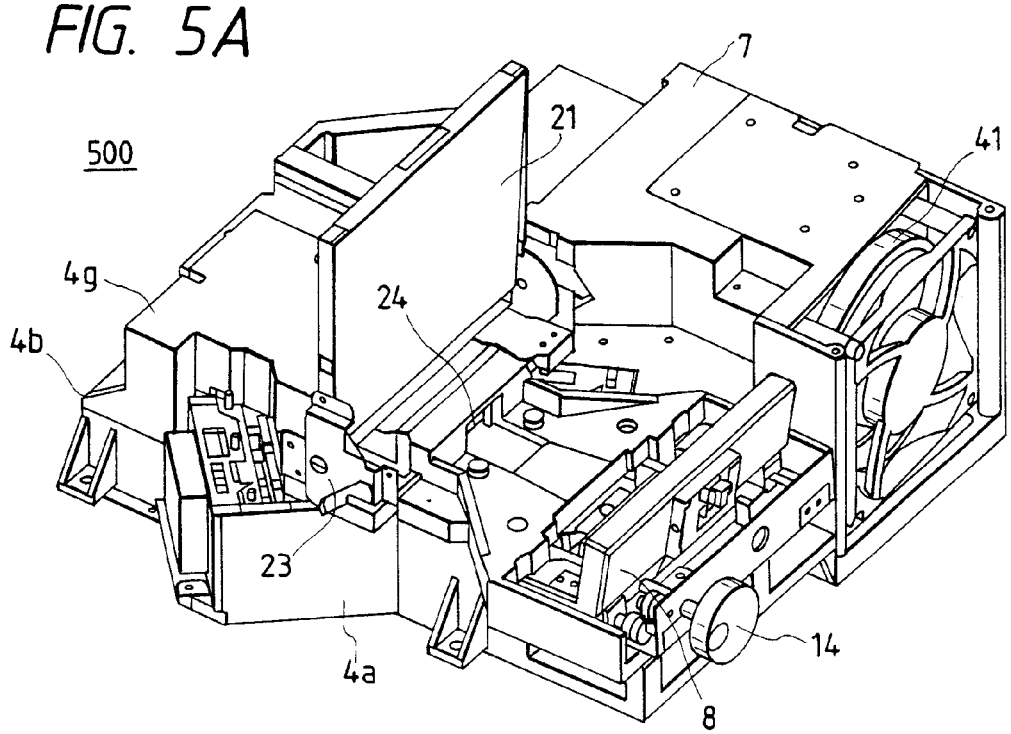
FIG. 5A is an external view of an optical unit of the first embodiment according to the present invention.
Figure 5B:
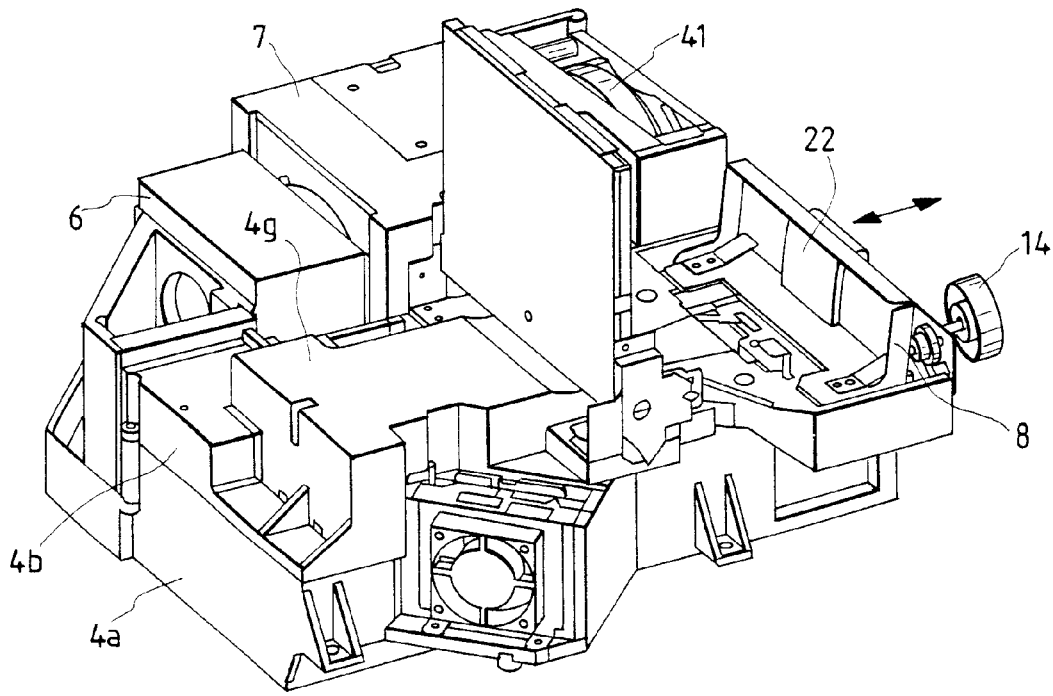
FIG. 5B is an external view of the optical unit when viewed from the opposite side.

In FIGS. 5A and 5B, a focusing dial knob for finely adjusting the second mirror lens 22 at a suitable position is provided on the outer cases 1a as shown in FIGS. 1 and 1b and an operator can easily bring an image enlarged and projected on the screen (hereinafter referred to as screen image") into focus.

On the premise of the constitution briefly described above, the inner structure of the projection type image display device 100 as shown in FIG. 1 will be hereinafter described in the concrete.

In the outer cases 1a and 1b of the projection type image display device 100, an optical unit 500 shown in FIG. 5 is assembled just as it is. The optical unit 500 is provided with the optical elements according to a predetermined layout. For example, the third mirror lens 21 is rotatably supported by an opening/closing mechanism 23 provided on an upper unit case 4b and the second mirror lens 22 is fixed to the movable part of a focusing mechanism 8 provided on the upper unit case 4b. The movable part of the focusing mechanism 8 is moved back and forth when the focusing dial knob 14 is turned.

Figure 6:
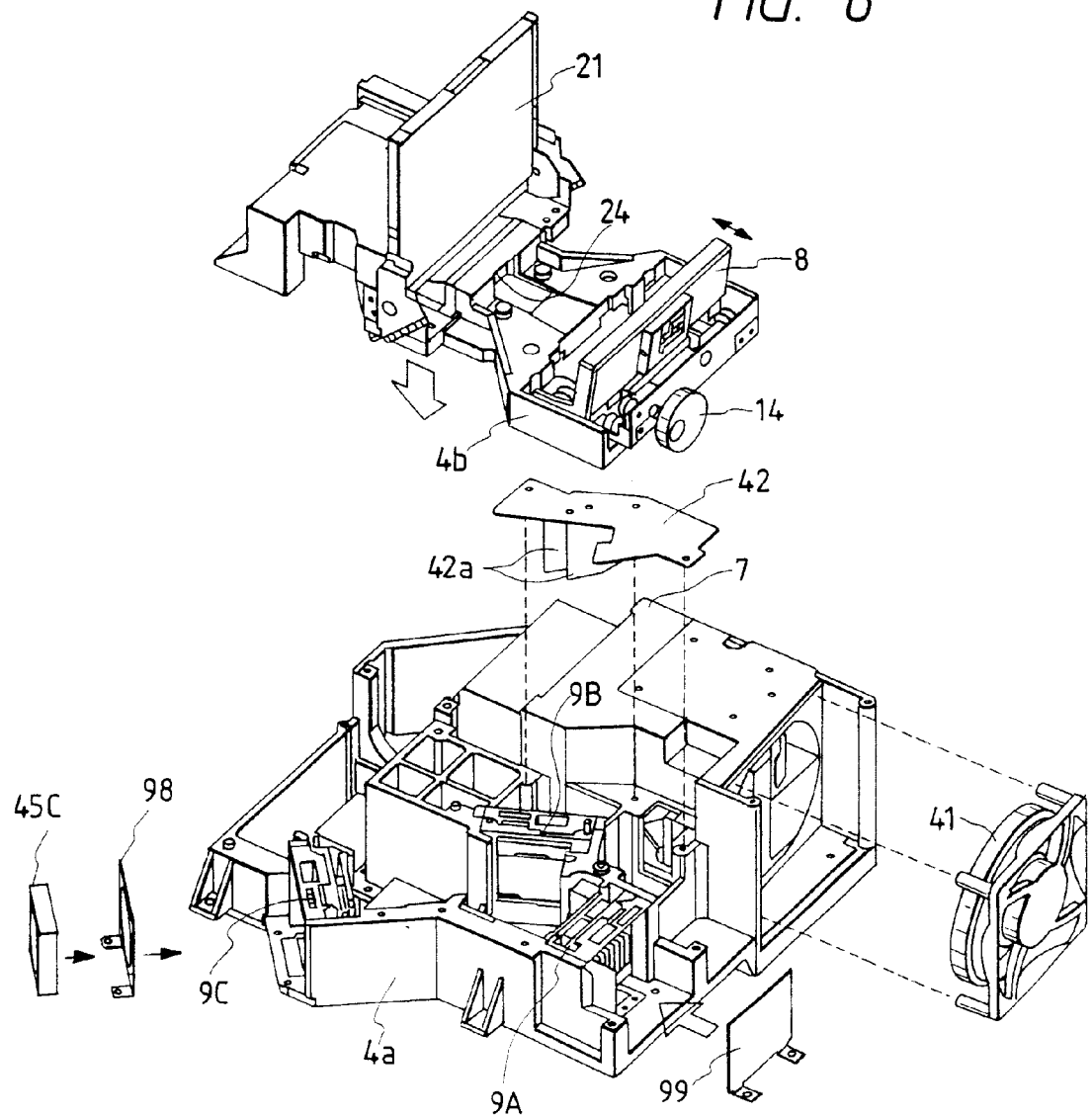
FIG. 6 shows a basic structure of an optical unit of the first embodiment according to the present invention.

Further, the reflection type LCD panels 91A, 91B and 91C, as shown in FIG. 6, are supported by the position adjusting mechanisms 9A, 9B and 9C fixed to a lower unit case 4a. If the upper unit case 4b is mounted on the lower unit case 4a, the wall planes of these two unit cases 4a and 4b form a hermetically closed room (corresponding to the inside of 4g in FIG. 5) is formed which shields a light pencil A2→A3→A4→A5 from the integrator lens 65 to the first mirror lens 25. Furthermore, the upper unit case 4b has a window through which the light pencil reflected by the first mirror lens 25 is projected toward the second mirror lens 22 and in which an aperture 24 formed of a transparent material is fitted. Therefore, the inside of the hermetically closed room is completely shut off from the outside air containing dust. That is, such a hermetically closed room can almost completely prevent the dust having a detrimental effect on the quality of the screen image from entering the vicinities of the light incidence/reflection planes of the reflection type LCD panels 91A, 91B and 91C, that is, the vicinities of focusing planes of mirror lenses.

Still further, the lower unit case 4a in FIG. 6 is provided with an air blowing fan 45C by a mounting plate 98. Heat radiating fins 92C for increasing the area of a heat radiating plane are provided on the surface opposite to the light incidence/reflection plane of the reflection type LCD panel 91C as shown in FIG. 7.

Figure 7:
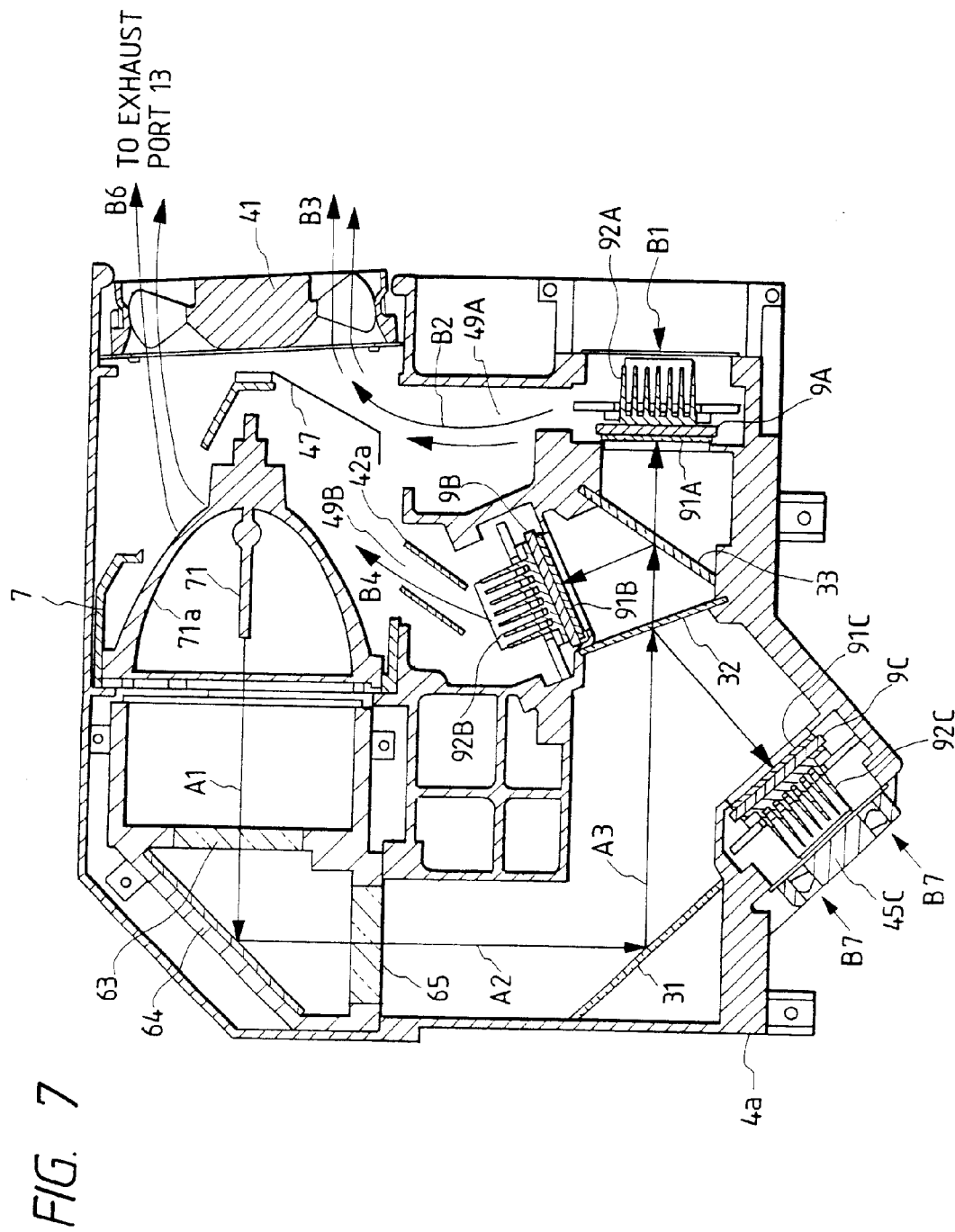
FIG. 7 is a cross sectional view of the optical unit shown in FIG. 5.

The light source 71, as shown in FIG. 7, is housed in a lamp case 7 fixed to the lower unit case 4a in which the exhaust fan 41 is fitted in such a manner that it faces the inside of the lamp case 7. Therefore, if the exhaust fan 41 is operated, the air in the lamp case 7 is actively exhausted from the exhaust port 13 of the outer cases 1a and 1b.

The outer wall of the hermetically closed room and an air guiding plate (42 in FIG. 6) fixed to the lower unit case 4a form a duct 49B for guiding an air flow B4 from the vicinity of the position adjusting mechanism 9B for supporting the reflection type LCD panel 91C, one of the reflection type LCD panels 91A, 91B and 91C, into the lamp case 7. Similarly, the outer wall of the hermetically closed room and the side wall of the lower unit case 4a form a duct 49A for guiding an air flow B2 from the vicinity of the position adjusting mechanism 9A for supporting the reflection type LCD panel 91A into the lamp case 7. In this regard, the directions of the air flows B2 and B4 are regulated by fins 42a provided on an air directing guide 47 and the air guiding plate 42a such that the air B2 and B4 can be reliably guided into the lamp case 7 heated by absorbing light radiated from the light source 71.

When the exhaust fan 41 is operated to exhaust the air B3 and B6 from the exhaust port 13, the pressure in the lamp case 7 is reduced and the air B4 near the plane opposite to the light incidence/reflection plane of the reflection type LCD panel 91B flows into the duct 49B from gaps above and below the position adjusting mechanism 9B and passes through the duct 49B and then flows into the lamp case 7. Similarly, the air B2 near the plane opposite to the light incidence/reflection plane of the reflection type LCD panel 91A flows into the duct 49A from gaps at the top and the bottom of the position adjusting mechanism 9A and passes through the duct 49A and then flows into the lamp case 7. Further, fresh air outside the optical unit 500 goes around the outer periphery of the optical unit 500 and reaches the intake port. In this respect, the planes opposite to the light incidence/reflection planes of two reflection type LCD panels 91A and 91B are provided with heat radiating fins 92A and 92B.

In this way, two ducts 49A and 49B share only one exhaust fan 41 and can constantly introduce fresh outside air into two reflection type LCD panels 91A and 91B and a lamp reflector 71a. Therefore, the whole optical unit 500, two reflection type LCD panels 91A and 91B, and the lamp reflector 71a heated by absorbing light beams in the range of infrared rays and in the range of ultraviolet rays can be cooled by the constantly flowing fresh outside air. Further, the heat of the light source 71 can be radiated sufficiently via the part where the light emitting tube of the light source 71 is put into contact with the lamp reflector 71a. Furthermore, since the fresh outside air is brought around the outer periphery of the optical unit 500 in this constitution, the heat stored in the whole optical unit 500 can be sufficiently radiated.

In this respect, there is a fear that the cooling efficiency of the lamp reflector 71a is reduced because the air flows B2 and B4 flowing into the lamp case 7 receive heat from the reflection type LCD panels 91A and 91B, but there is no fear of this kind because the air is introduced from a low temperature side to a high temperature side. For example, the air introduced from the intake port and having ordinary temperatures (for example, about 25° C.) is heated to about 30° C. at the maximum by the heat radiation from the reflection type LCD panels 91A and 91B whose operating temperatures are, for example, about 60° C. at the most. Therefore, it is obvious that the cooling efficiency of the lamp reflector 71a disposed near the lamp 71 having an extremely higher operating temperature (for example, 300° C.) than is this operating temperature might not be reduced.

That is, the incidence of failure of the LCD panel, such as a breakdown caused by heat generated while it is used, can be reduced by using the duct structure described above. Further, since the exhaust fan producing noises is not required to be provided on each heat generating body, the duct structure described above also has other merits that it does not give the audience an unpleasant feeling and that it can simplify the inside structure of the device. Even in a case in which all three LCD panels are not cooled by the exhaust fan 41, the constitution of the whole set can be simplified to produce the same effects of improving reliability and reduction in the parts thereof.

In this embodiment, although two of three LCD panels share a part of cooling means with the illumination side and one remaining LCD panel has a cooling fan intended therefor, it is needless to say that the same effects can be produced even if all three fans are shared or two fans are intended for the purpose and one remaining fan is shared.

Figure 8:
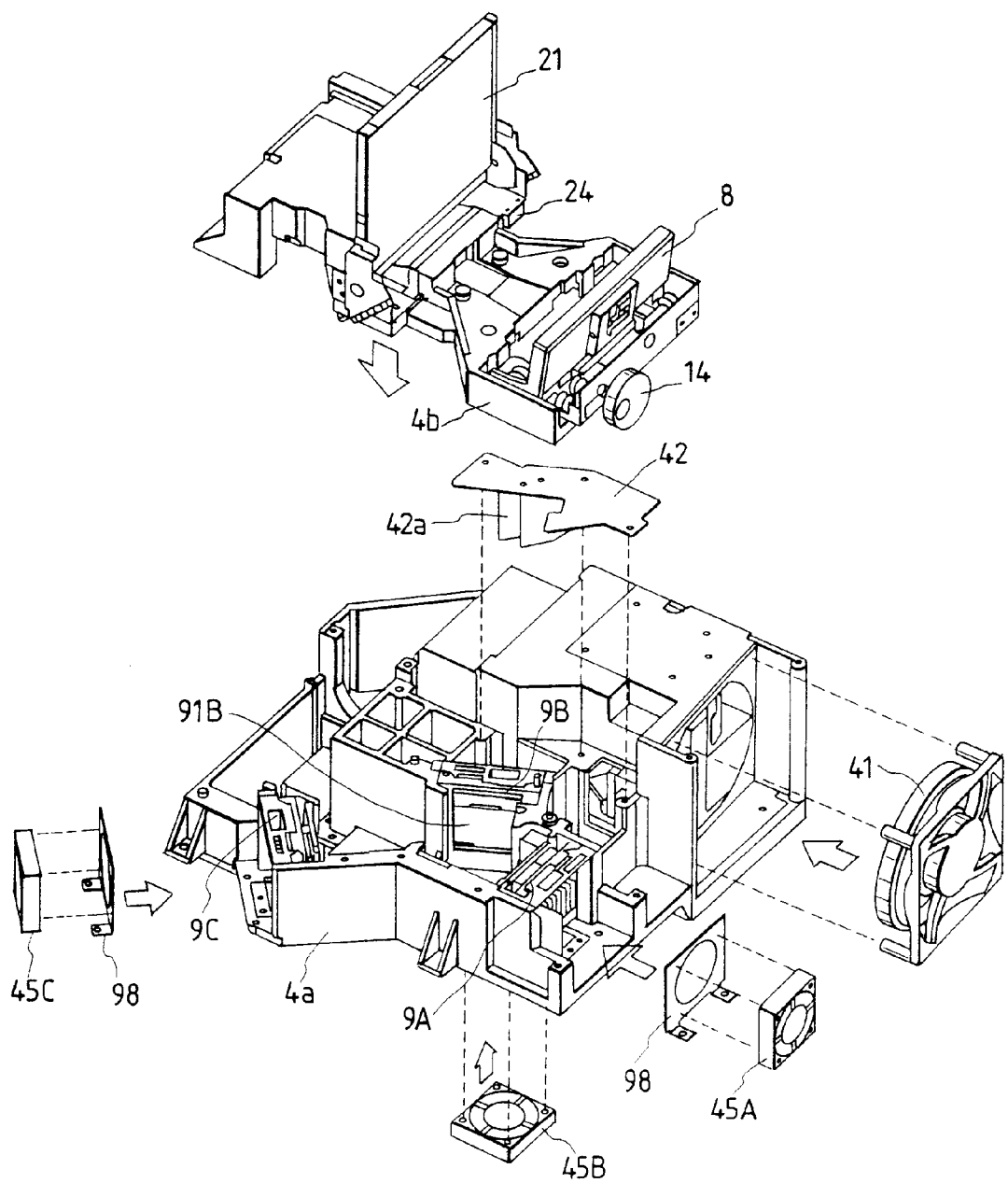
FIG. 8 shows a basic structure of an optical unit of the second embodiment according to the present invention.

FIG. 8 is an exploded view of an inner structure of the second embodiment according to the present invention. The image display mechanism is divided into the lower unit case 4a and the upper unit case 4b and these cases constitute the main part of the hermetically closed space. Further, an air introducing passage (duct) extending toward the lamp case is joined to the position adjusting mechanism 9A, 9B, 9C for supporting the LCD panels which needs to be cooled. The air introducing plate 42 forming a part of the duct acts as a cover. Furthermore, the suction fan 45A, 45B, 45C is provided in the vicinity of the position adjusting mechanism 9A, 9B, 9C of the LCD panels. Each of three LCD panels is provided with one fan, respectively.

Further, it is recommended that the air blowing fan 45B intended for the reflection type LCD panel 91B near the center of the lower unit case 4a be fixed by a fixing plate to the window formed in the bottom surface of the lower unit case 4a.

Figure 9:
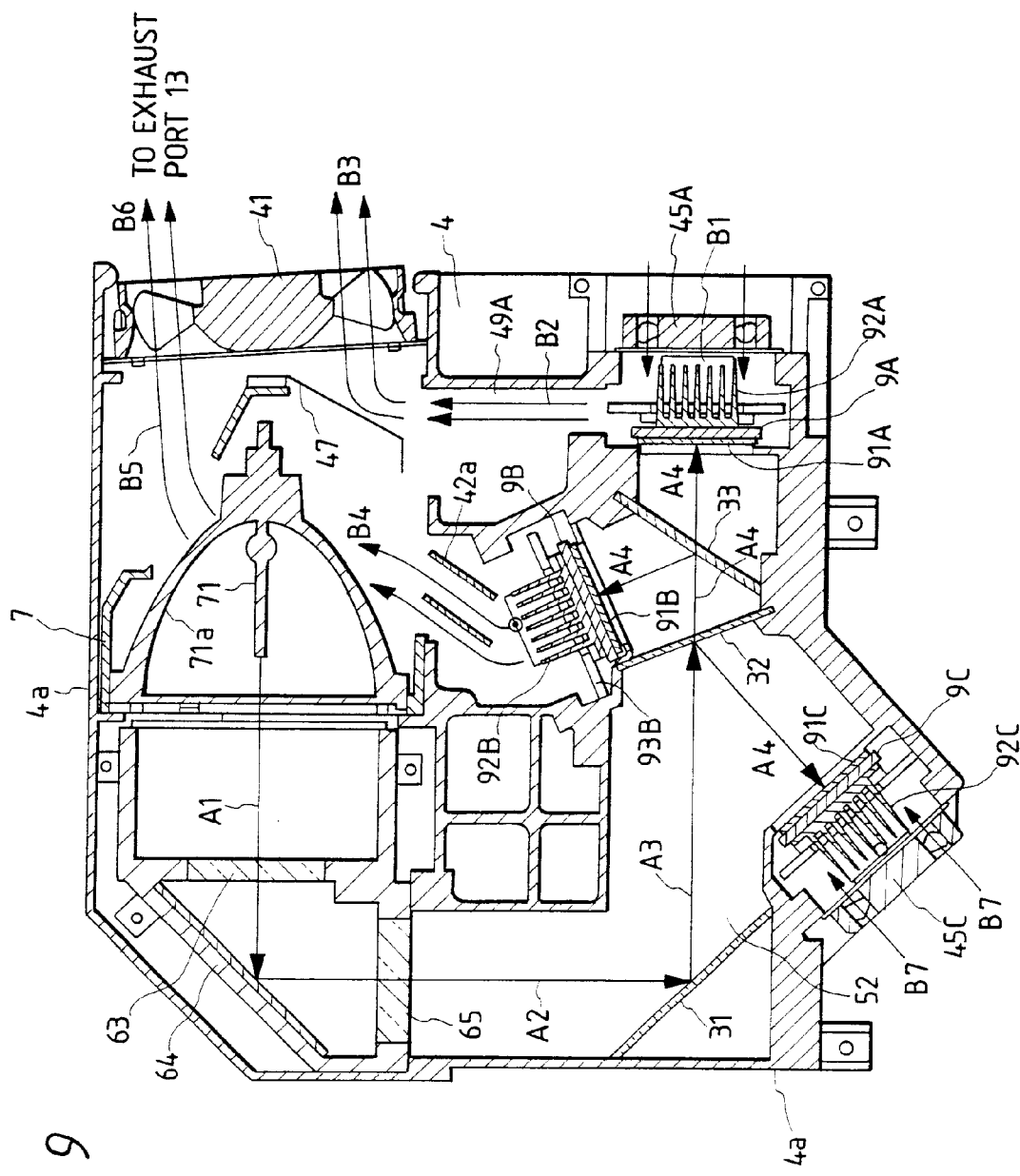
FIG. 9 is a cross sectional view of the optical unit shown in FIG. 8.

If such a constitution is employed, the fans can be used flexibly according to usage conditions; for example, when the operating temperature is considerably low, the exhaust fan 41 is stopped and a part of or all of three air blowing fans 45A, 45B and 45C is operated. Further, although it is disadvantageous from the viewpoint of reducing noises that all air blowing fans 45A, 45B and 45C are operated with the exhaust fan 41, as shown in FIG. 9, such an operation is very advantageous when a large amount of air flow is required or when a pressure drop in the duct is large (resistance of air flow is large) because air is forcibly introduced on the planes opposite to the light incidence/reflection planes of all reflection type LCD panels 91A, 91B and 91C and is pulled by the exhaust fan 41.

Even if the device is constituted in this way, it can be easily modified to the embodiment shown in FIG. 5 and FIG. 6 only by removing two air blowing fans 45A and 45B and by replacing the fixing plates 98 for fixing these air blowing fans 45A and 45B to the lower unit case 4a with partition plates (shown by 99 in FIG. 6). Therefore, the number of air blowing fans mounted in addition to the air blowing fan 45C can be selected according to usage conditions such as input of the light source or the like; for example, when the ordinary light source of about 120 watt is used, the embodiment shown in FIG. 5 and FIG. 6 is employed, and when the light source is 300 watt, that is, 2.5 times larger than the ordinary light source, the embodiment shown in FIG. 8 and FIG. 9 is employed. Further, when the light source is small enough to be cooled by only three air blowing fans 45A, 45B and 45C, for example, when the light source of a considerably small input (for example, about 50 watt) is used, as shown in FIG. 10, it is also recommended that three air blowing fans 45A, 45B and 45C be not removed but that the exhaust fan 41 disposed at the position where noises are liable to leak outside be removed.

Figure 10:
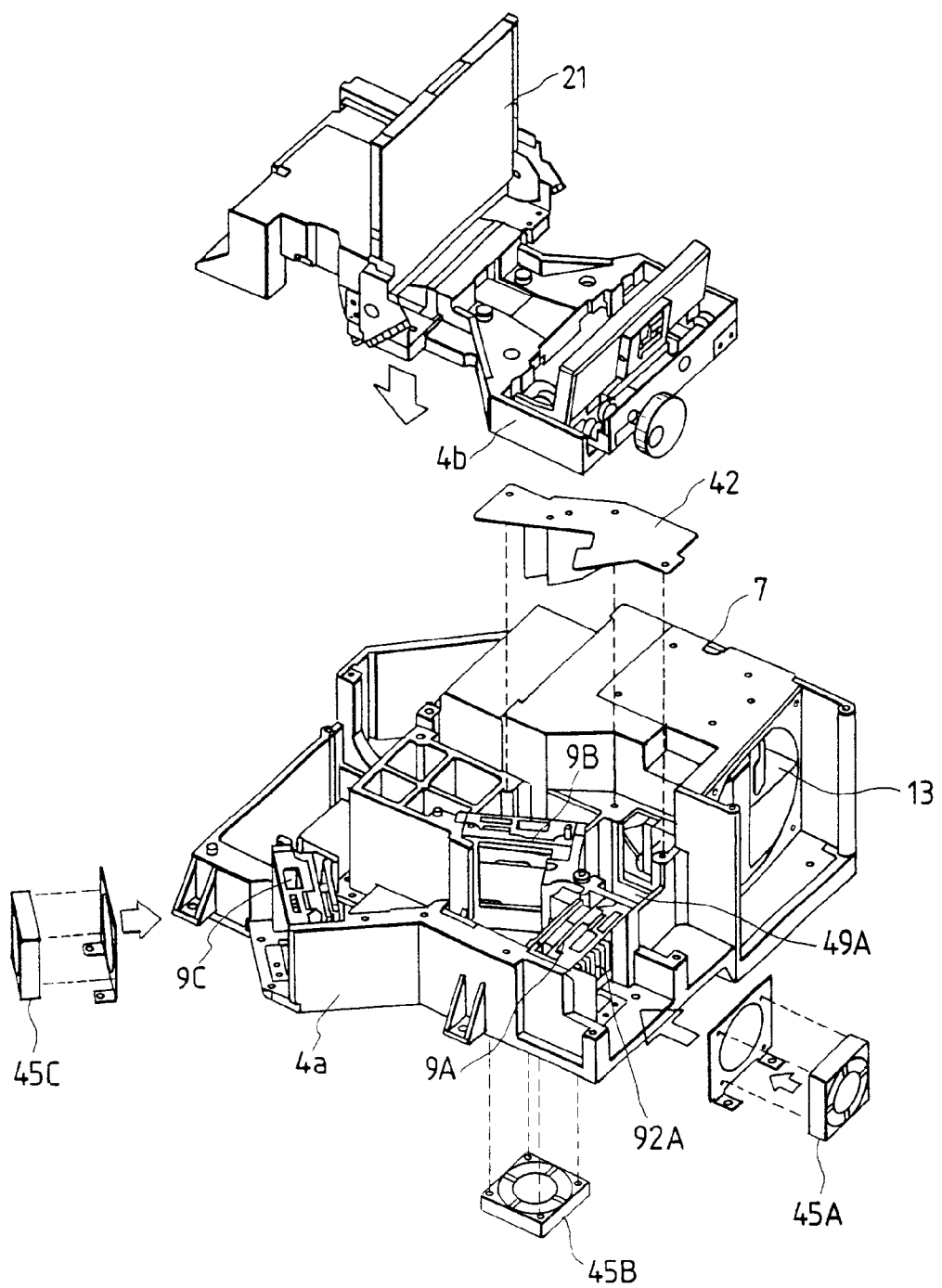
FIG. 10 shows the third embodiment according to the present invention.

FIG. 10 is a perspective view of the third embodiment according to the present invention.

Figure 12:
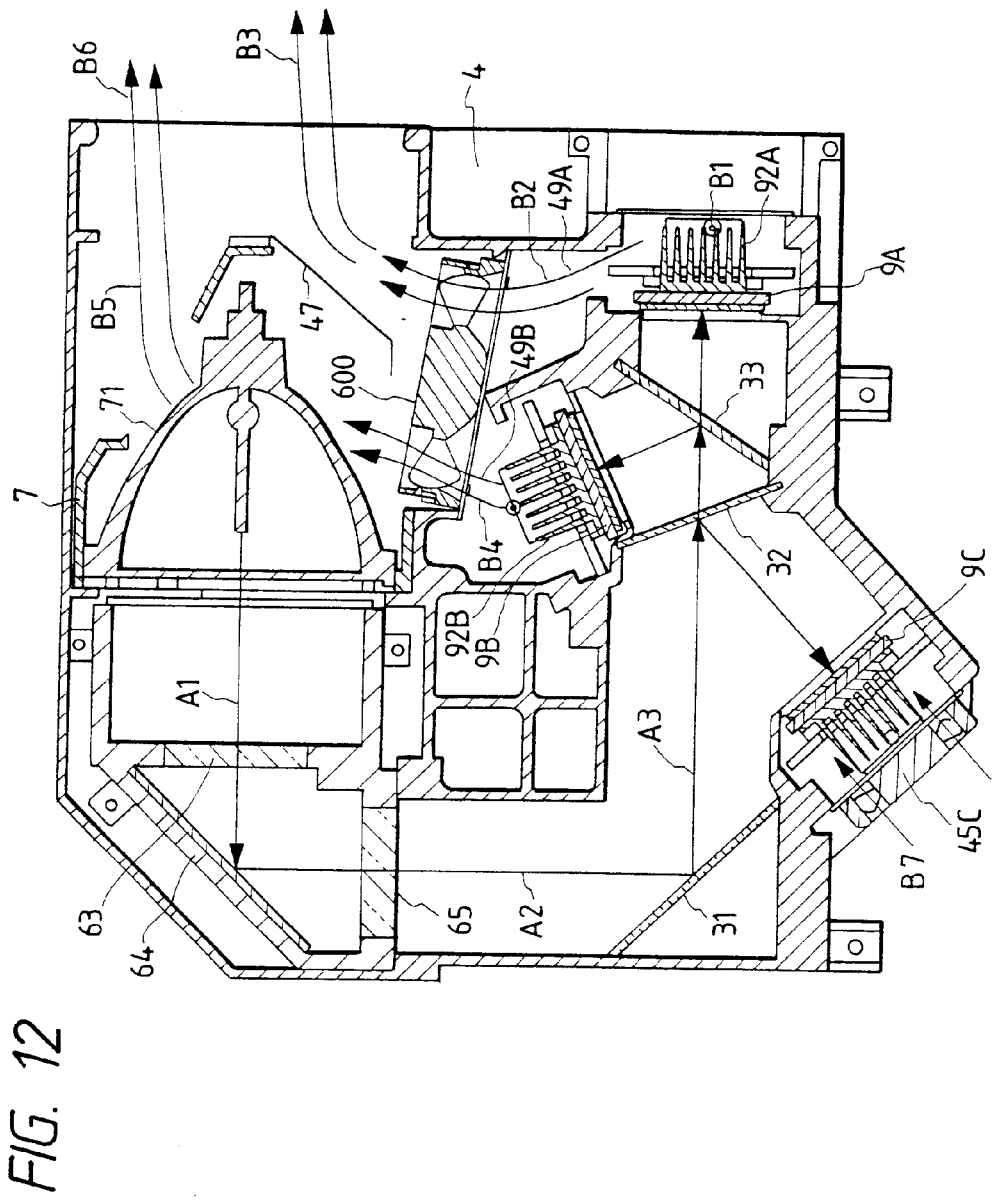
FIG. 12 is a cross sectional view of the fifth embodiment according to the present invention, in which a fan is disposed in a duct.

In this constitution, if the power of the illumination lamp is small, for example, 50 watt, the whole device can be cooled only by the small fans of the intake sides without using the exhaust fan. In this case, as shown in FIG. 12, the device can be cooled only by the fan of the intake side. That is, the air sucked like a streamline B1 by the intake side fan 45A exchanges heat with the heat radiating fin 92A and advances to the lamp case side 7 through the duct 49A. The air advancing along the outer periphery of the lamp and exchanging heat with the lamp 71 is exhausted outside through exhaust port 13. In this constitution, noises of the fans leaking outside from the exhaust port can be reduced because the exhaust fan can be removed.

Figure 11:
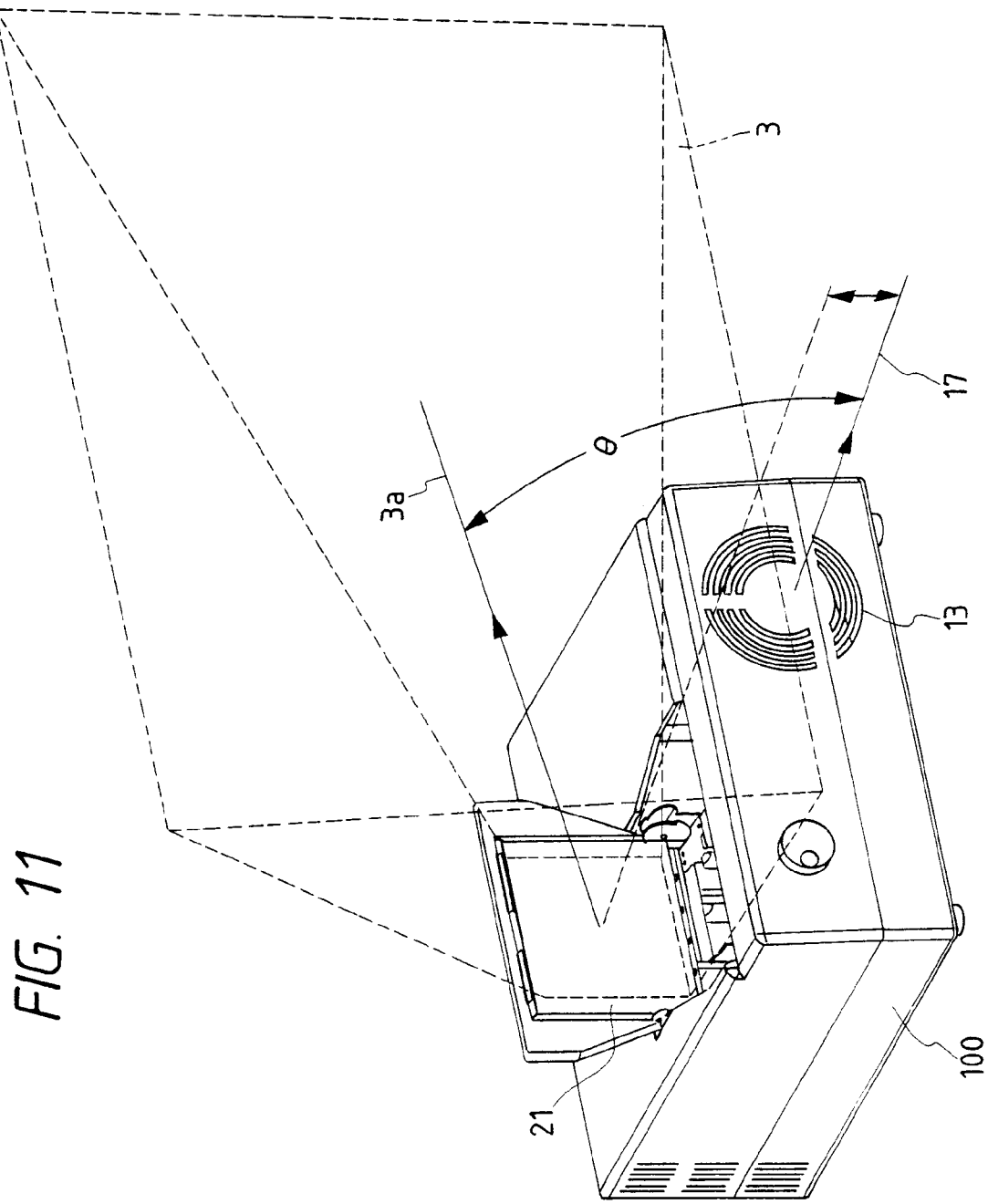
FIG. 11 illustrates a position relationship between an optical path of a flux of light projected on a screen and a direction of exhaust from an exhaust port of the fourth embodiment according to the present invention.

FIG. 11 shows the fourth embodiment according to the present invention. The most suitable position relationship between the direction in which exhaust air from the exhaust port 13 of the outer cases 1a and 1b advances and the optical path of the light pencil 3 projected on the screen will be described with reference to FIG. 11. It is verified by experiment that, if an angle θ formed by the central axis of the exhaust port 13 of the outer cases 1a and 1b, that is, the direction 17 in which the exhaust air from the exhaust port 13 advances and the optical axis of the light pencil 3 projected on the screen is smaller than 30 degrees, a problem is produced that warmed air exhausted from the exhaust port 13 of the outer cases 1a and 1b unstable air in the optical path of the light pencil 3 reflected by the third mirror lens 21 to flicker the screen image. Further, it is also verified by experiment that, if the angle θ is in the range of larger than 90 degrees, for example, as in the case in which the exhaust port 13 is in the side which does not face the screen, the warmed air is scattered beside and behind the projection type image display device 100 to make the audience feel unpleasant.

Therefore, it is desirable to design a position of the third mirror lens 21 when used, that is, a position relationship between the third mirror lens 21 when used and the exhaust port 13, while bearing in mind that this angle θ is in the range of 30 to 90 degrees, in other words, that the exhaust air is blown off along the path which is different in height from the optical axis 3a of the light pencil 3 projected on the screen. In this regard, the angle θ is actually about 50 degrees.

FIG. 12 is a cross sectional view of the inner constitution of the fifth embodiment according to the present invention. That is, the fourth embodiment has a constitution in which the fan is provided on the intake port side of the LCD panel side and is not provided on the exhaust port side.

In this constitution, a middle fan 600 is disposed in the middle of the intake port of the LCD panel side and the exhaust port of the illumination means side. The middle fan 600 sucks air at the intake side and exhausts the air at the exhaust side. Therefore, the air sucked like a streamline B1 from the intake port side by the middle fan 600 exchanges heat with the heat radiating fin 92A and advances like a streamline B2 to the lamp case side 7 through the duct 49A and the middle fan 600. The air like a streamline B2 advancing along the outer periphery of the lamp 71 and exchanging heat with the lamp 71 in the lamp case 7 is exhausted outside like the streamlines B5 and B3. In this constitution, since the air is not blown off directly from the exhaust port by the fan, noises can be reduced and since the fan is disposed not in the intake port side but in the middle, the amount of wind might not be reduced by a pressure drop by the fan.

Although the light valve of reflection LCD panel type has been described as the light valve means in the embodiments described above, the light bulb element of the other type such as transmittance type LCD panel, micro mirror (micro mirror driving) type, laser liquid writing type may be employed. Further, although a reflection mirror lens has been described as the optical system, the optical element other than the reflection mirror lens such as refraction lens, a combination of a refraction lens and the reflection mirror lens can also produce the same effect.

In the description, the image display mechanism and the image display device in which the image display mechanism is built are described together, but only the image display mechanism or only the image display device in which the image display mechanism is built can also produce the same effect. That is, even if the image display mechanism is built directly in a building and the exterior thereof is integrated with the building, or even if the image display mechanism is housed in a big cabinet and projects the image on a transmittance type screen fixed to the outer wall of the cabinet, the image display mechanism can produce the same effect.

Next, the schematic constitution of the projection type image display device of the sixth embodiment according to the present invention will be described with reference to FIG. 1. In the outer cases 1a and 1b of the projection type image display device 100, the light source, the reflection type LCD panel and the other optical elements constituting the optical system are housed. Further, the outer cases 1a and 1b have in the predetermined regions the intake port 12 for introducing the outside air thereinto and the exhaust port 13 for exhausting the air while the device is used. The exhaust fan is housed in the outer cases 1a and 1b in such a way that it faces the exhaust port 13. The outside air introduced from the intake port 12 passes through the outer cases 1a and 1b to the intake port of the optical unit.

When the device is used, as shown in FIG. 2, the cover 11 mounted on the outer case 1a is opened and only the third mirror lens 21 is taken out from within the outer cases 1a and 1b. In this respect, the mirror lens employed in the present projection type image display device 100 is an optical part having a curved mirror plane (spherical plane or non-spherical plane) for forming an image. Therefore, these mirror lens may be replaced by the other optical elements having the same function such as a refractive lens, a combination of a refractive lens and a mirror.

When the light source is lit on in the state in which the third mirror 21 is erected, as shown in FIG. 3, a light pencil 3 containing image information written in the reflection type LCD panel is reflected by the third mirror lens 21 and is projected on the screen. The optical path of the light pencil 3 at this time will be described in detail as follows.

As shown in FIG. 4, a light pencil having a suitable amount of light radiated from the light source 71 (lamp in the present embodiment) passes first through the integrator 63 and then is reflected by the mirror 64 and passes through the integrator 65 and is reflected by the mirror 31 and then is introduced to two dichroic mirrors 32 and 33. The light pencil separated by these dichroic mirrors 32 and 33 into color components (for example, red, green and blue color components) enters the light incidence/reflection planes of reflection type LCD panels 91A, 91B and 91C at predetermined incidence angles (not zero) via field lenses (not shown) and is modulated every picture element by the reflection type LCD panels 91A, 91B and 91C for displaying colors. In this regard, to separate the light pencil advancing from the mirror 31 from the modulated light pencil advancing to the first mirror lens 25 described below by the reflection by the light incidence/reflection planes of the reflection type LCD panels 91A, 91B and 91C, the light pencil is let on the light incidence/reflection planes of the reflection type LCD panels 91A, 91B and 91C at predetermined incidence angles. The optical path A1→A2→A3 will be hereinafter referred to as an illumination path.

Then, the modulated light pencils reflected by the reflection type LCD panels 91A, 91B and 91C for displaying colors are introduced again to two dichroic mirrors 32 and 33 via the field lenses (not shown) and are converged into one light pencil by these two dichroic mirrors 32 and 33 and then is reflected by the first mirror lens 25 and is reflected by the second mirror lens 22 and is introduced to the third mirror lens 21 taken out outside the outer cases 1a and 1b. The optical path A4→A5→A6→A7 will be referred to as a projection path.

This enlarges the color image written on the reflection type LCD panels 91A, 91B and 91C for displaying colors and displays it on the screen (not shown). In this regard, the image enlarged and projected on the screen (hereinafter referred to as screen image") is brought into focus by the focusing dial knob 14 protruding from the outer cases 1a and 1b.

On the premise of the constitution briefly described above, the inner structure of the present projection type image display device 100 will be hereinafter described in the concrete.

In the outer cases 1a and 1b of the projection type image display device 100, the optical unit 500 shown in FIG. 5 is assembled just as it is. The optical unit 500 is provided with the optical elements and the like according to a predetermined layout. For example, the third mirror lens 21 is rotatably supported by the opening/closing mechanism 23 provided on the upper unit case 4b and the second mirror lens 22 is fixed to the movable part of a focusing mechanism 8 provided on the upper unit case 4b. The movable part of the focusing mechanism 8 is moved when the focusing dial knob 14 is turned.

Figure 13:
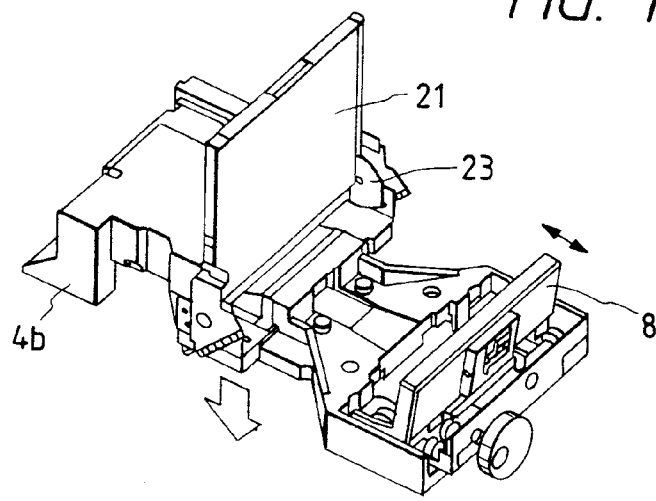
FIG. 13 is an exploded view of the sixth embodiment according to the present invention.
Figure 13:
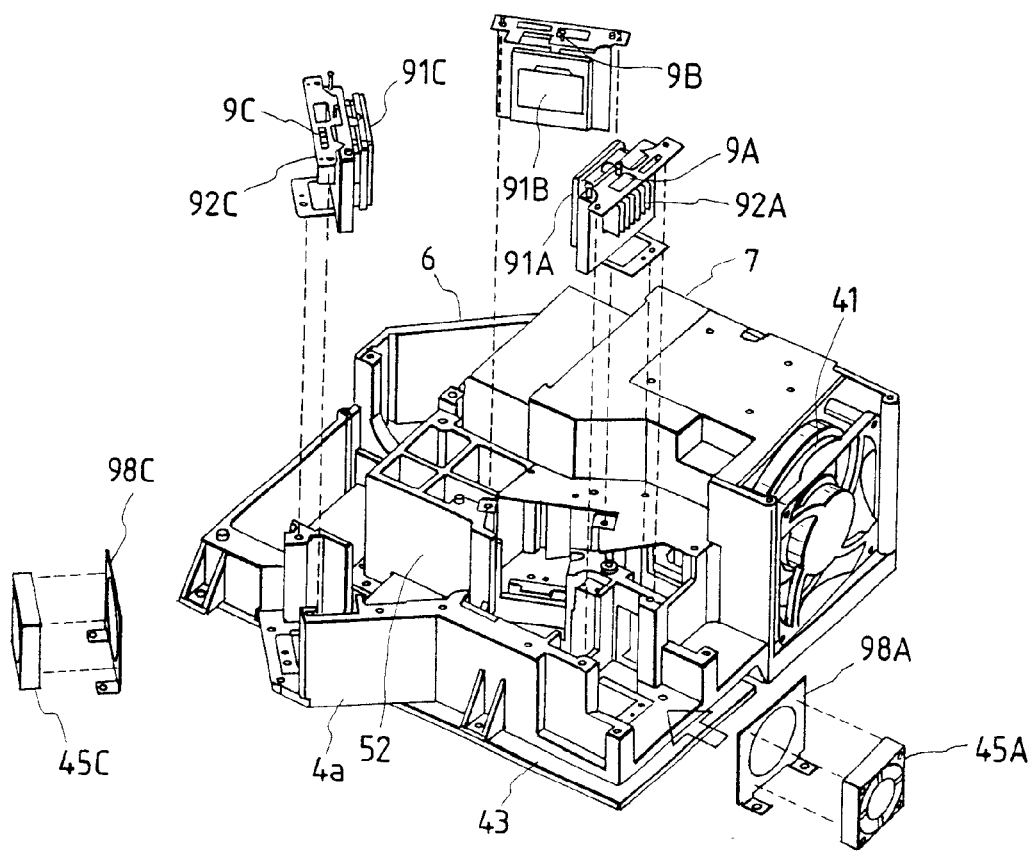

Further, the reflection type LCD panels 91A, 91B and 91C, as shown in FIG. 13, are fixed to the guide part of the lower unit case 4a by the position adjusting mechanisms 9A, 9B and 9C. The structure of the position adjusting mechanisms 9A, 9B and 9C will be described below.

Figure 14:
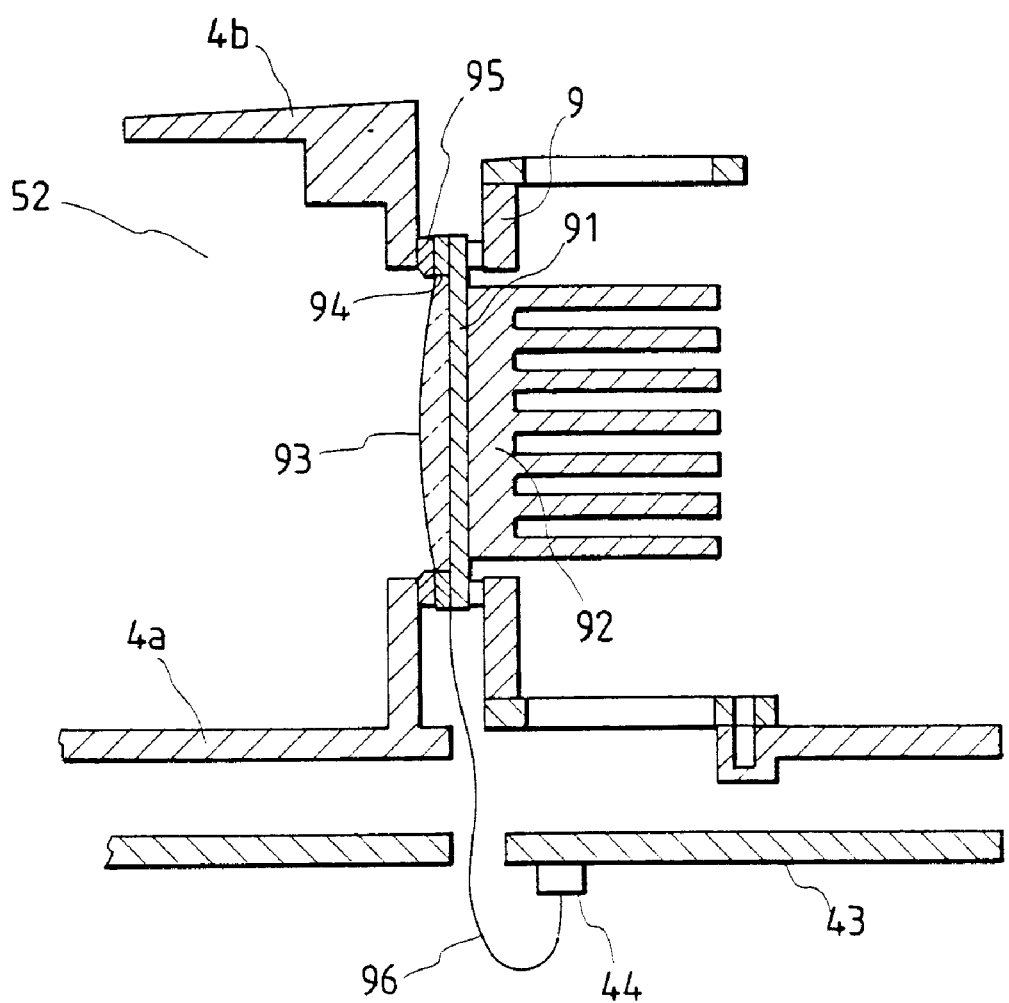
FIG. 14 is an enlarged view of a reflection type LCD panel shown in FIG. 8.

If the upper unit case 4b is mounted on the lower unit case 4a, a hermetically closed room (corresponding to a space 52 in FIG. 9) is formed, which is surrounded by the inner wall planes of these two unit cases 4a and 4b, the integrator 65 and the light incidence/projection planes of the reflection type LCD panels 91A, 91B and 91C. That is, the hermetically closed room 52 is formed which can shield, almost from the outside air, the optical path according to the FIG. 5 A2→A3→A4→A5 from the integrator lens 65 to the light incidence/projection planes of the reflection type LCD panels 91A, 91B and 91C via the mirror 31 and the like. In this regard, the position adjusting mechanisms 9A, 9B and 9C are not housed in the hermetically closed room 52 so as to easily handle the adjusting screws described below provided on the position adjusting mechanisms 9A, 9B and 9C. Further, the reflection type LCD panels 91A, 91B and 91C are provided across two unit cases 4a and 4b and are used as parts of the partition walls of the hermetically closed room 52 so as to improve workability in assembling the device and to simplify a maintenance/inspection work and an adjusting work. In this respect, the inside of the hermetically closed room 52 can be repaired and inspected by removing the upper unit case 4a. To prevent the light scattered in the vicinity of the reflection type LCD panels 91A, 91B and 91C from leaking outside the hermetically closed room 52, as shown in FIG. 14, a packing 95 formed of a shading material is fitted in each joint of a field lens frame 94 described below and two unit cases 4a and 4b. Further, the material forming the packing 95 is not only shading but also elastic lest should the hermetically closed room 52 loses hermetic property even when the positions of the reflection type LCD panels are adjusted.

In this constitution, when the hermetically closed room 52 is opened or closed so as to assemble, adjust, repair or inspect the device, the upper unit case 4a is removed, and hence the positions where the position adjusting mechanism 9 and the reflection type LCD panel 91 are supported by the lower unit case 4b are not affected. That is, when the hermetically closed room 52 is opened or closed, it is not necessary to again adjust the positions of the position adjusting mechanism 9 and the reflection type LCD panel 91.

The hermetically closed room described above can almost completely prevent dust having a detrimental effect on the quality of the screen image from entering the light incidence/reflection planes of the reflection type LCD panels 91A, 91B and 91C, that is, the vicinities of focusing planes of the mirror lenses of projection system.

As shown in FIG. 6 and FIG. 7, further, the lower unit case 4a is provided with the air blowing fan 45C by a mounting plate 98C. Furthermore, another air blowing fan 45A is mounted on the side opposite to the light incidence/reflection plane of the reflection type LCD panel 91A by the mounting plate 98A. Still further, the exhaust fan 41 is fitted in the lower unit case 4a in such a way that it faces the inside of the lamp case 7 in which the light source 71 is housed. Therefore, as shown in FIG. 9, if the exhaust fan 41 is operated to forcibly exhaust the air B3, B6 in the lamp case 7, the pressure in the lamp case 7 is reduced and the air B4 near the plane opposite to the light incidence/reflection plane of the reflection type LCD panel 91C passes through gaps above and below the position adjusting mechanism 93B and flows into the lamp case 7. Similarly, the air B2 near the plane opposite to the light incidence/reflection plane of the reflection type LCD panel 91A passes through gaps above and below the position adjusting mechanism 93A and flows into the lamp case 7. Further, the outside air B7 introduced from the intake port 12 passes along the outer periphery of the unit cases 4a and 4b and the outer wall of the hermetically closed room and flows into near the plane opposite to the light incidence/reflection plane of the reflection type LCD panel 91A.

Since the whole optical unit 500 exchanges heat with the fresh outside air constantly introduced thereinto in this constitution, the incidence of failure caused by heat while it is used can be reduced.

In this respect, there is a fear that the cooling efficiency of the light source is reduced because the air flowing into the lamp case 7 receives heat from the reflection type LCD panels 91C, but there is never a fear of this kind because the air is introduced, in particular, from a low temperature side to a high temperature side. For example, the air introduced from the intake port 12 as shown in FIG. 7 and having ordinary temperatures (for example, about 25° C.) is heated to about 30° C. at the maximum by the heat dissipated from the reflection type LCD panels 91A and 91B whose operating temperature is, for example, about 60° C. Therefore, it is obvious that the cooling efficiency of the light source having an extremely higher operating temperature (for example, 300° C.) than is this operating temperature might not be reduced.

Figure 15:
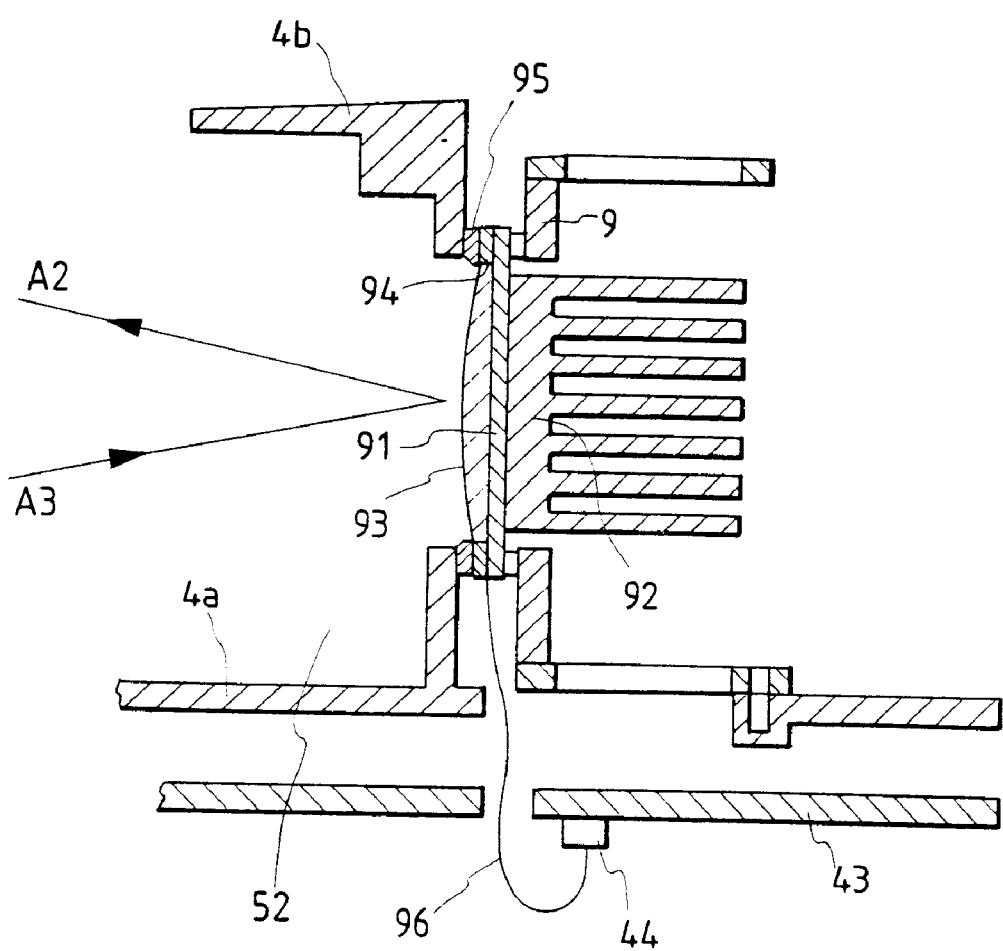
FIG. 15 illustrates a position relationship between an optical path of a light pencil modulated by a reflection type LCD panel and a drive circuit substrate.

Further, as shown in FIG. 15, a drive circuit substrate 43 for giving a drive signal to the reflection type LCD panels 91 is disposed opposite to the optical path A2 of the projection system across the optical path A3 of the illumination system. In FIG. 5, LCD panel 91 represents three crystal panels 91A, 91B and 91C. Furthermore, signal cables 96 connected to the connectors 44 of these drive circuit substrates 43 are taken out from the sides near the drive circuit substrates of the reflection type LCD panel 91 so as to shorten the length of the cable. This structure can reduce noises and prevent unnecessary radiation.

Next, the position adjusting mechanism of the LCD panel will be described.

Figure 16:
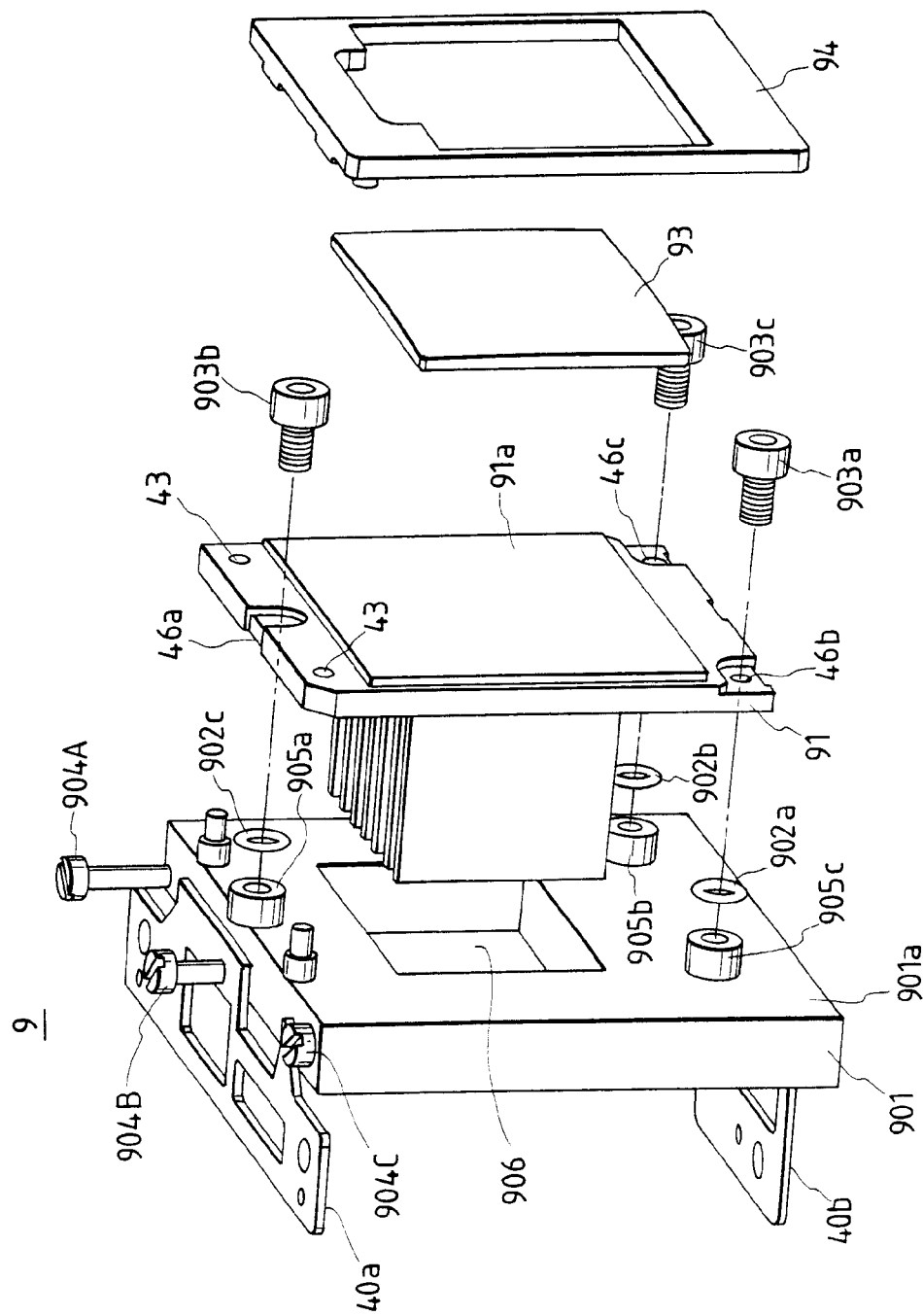
FIG. 16 is an exploded view of a position adjusting mechanism of one embodiment according to the present invention.

As shown in FIG. 16, mounting seats 905a, 905b and 905c having threaded holes are fixed to the front plane 901a of a support base 901 at a plurality of positions (for example, three positions in the present embodiment). In the center of the support base 901, a ventilating opening 906 is formed in which heat radiating fins provided on the plane opposite to the light incidence/reflection plane of the reflection type LCD panel 91 are loosely inserted. Further, on the upper plane and the bottom plane of the position adjusting mechanism, fixing plates 40a and 40b are mounted which have through holes for passing fixing screws and positioning holes. The reflection type LCD panel 91 has through holes 46a, 46b and 46c of suitable diameters at the positions corresponding to the screw holes of these mounting seats 905a, 905b and 905c.

Figure 17:
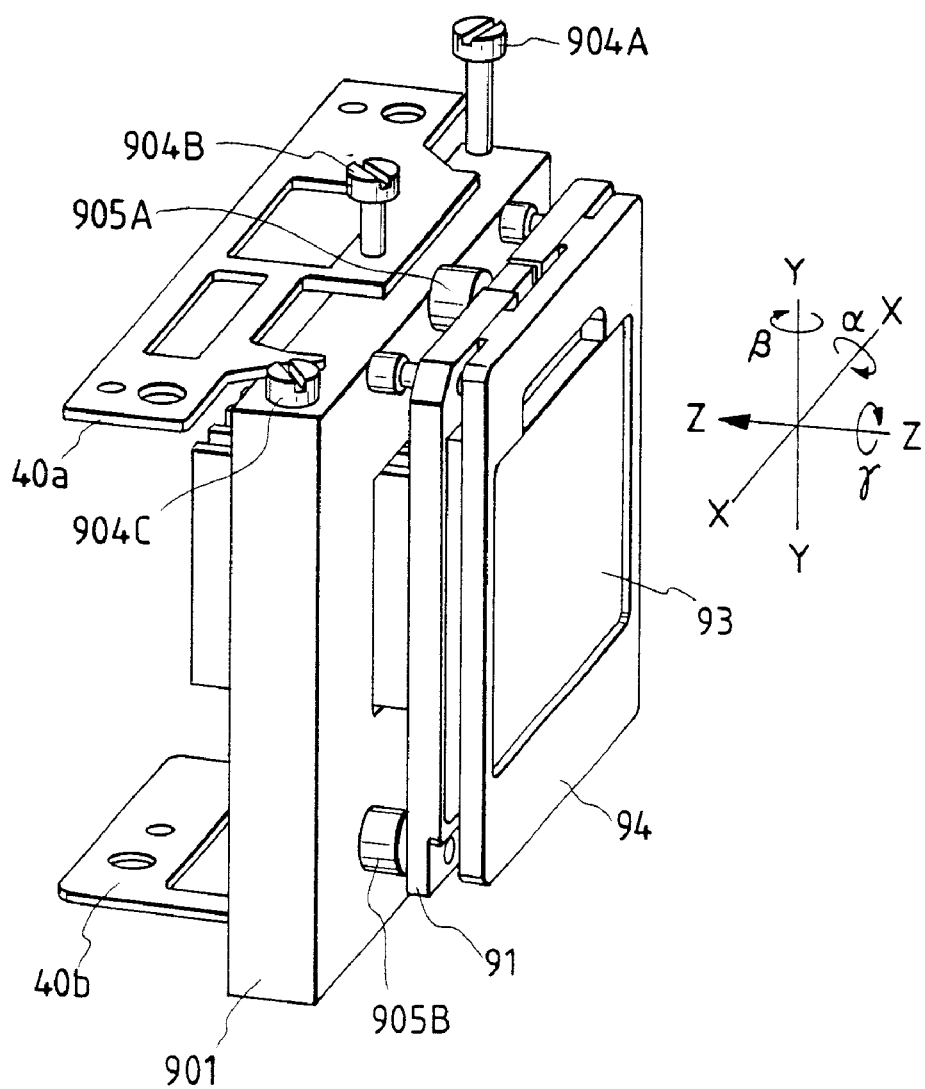
FIG. 17 is an external view of a position adjusting mechanism of one embodiment according to the present invention.

Therefore, if the adjusting screws 903a, 903b and 903c are inserted into the through holes 46a, 46b and 46c in a state in which the front plane 901a faces the plane opposite to the light incidence/reflection plane of the reflection type LCD panel 91, and are screwed in the threaded holes of the mounting seats 905a, 905b and 905c, the reflection type LCD panel 91 can be fixed to the front plane 901a of the support base 901. In this respect, O-rings 902a, 902b and 902c are sandwiched between the mounting seats 905a, 905b and 905c and the plane opposite to the light incidence/ reflection plane of the reflection type LCD panel 91. If the field lens frame 94 is fixed to the LCD panel 91 such that it presses the field lens 93 on the light incidence/reflection plane 91a of the LCD panel 91, as shown in FIG. 17, the position adjusting mechanism which can be mounted on the lower unit case 4a is completed.

Figure 18:
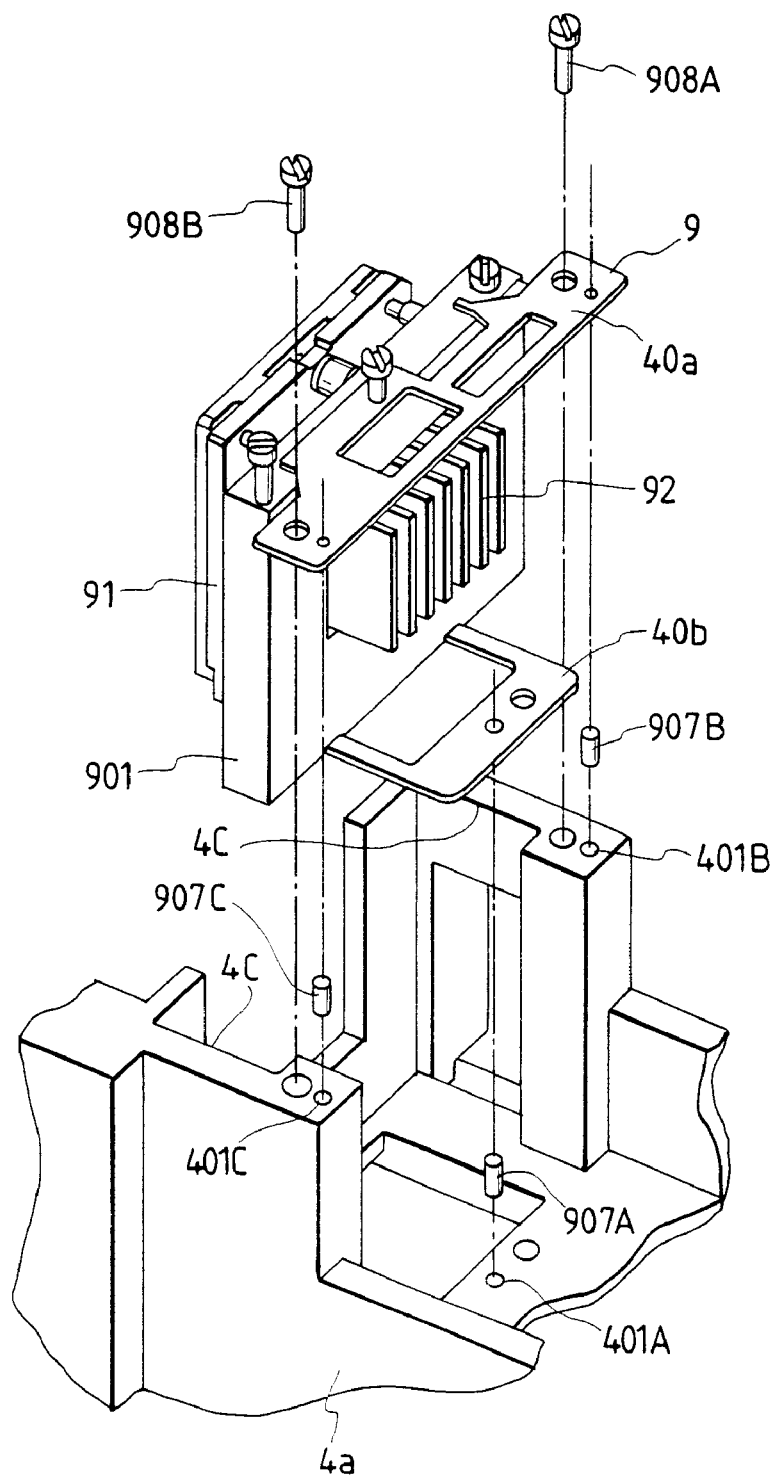
FIG. 18 illustrates a method for mounting a position adjusting mechanism on an optical unit.

The position adjusting mechanism 9 is finally mounted on the lower unit case 4a with extreme ease, as shown in FIG. 18, by the following steps: the position adjusting mechanism 9 is slipped into the guide 4c formed in the lower unit case 4a from a predetermined direction and then the fixing plates 40a and 40b are fixed to the lower unit case 4a by the fixing screws 908A and 908B. Further, the mounting position of the position adjusting mechanism 9 is determined by the clearance fit of the positioning pins 907A, 907B and 907C fitted in the holes 401A, 401B and 401C made in the lower unit case 4a with the positioning holes of two fixing plates 4a and 40b of the position adjusting mechanism 9. Therefore, the position adjusting mechanism 9 can be easily mounted or dismounted when the inside of the hermetically closed room 52 needs to be repaired.

As described above and as shown in FIG. 16, the O-rings 902a, 902b and 902c are sandwiched between the mounting seats 905A, 905B and 905C and the plane opposite to the light incidence/reflection plane of the reflection type LCD panel 91. Therefore, a distance between the front plane 901a of the support base 901 and the reflection type LCD panel 91 and a slant angle of the reflection type LCD panel 91 with the front plane 901a of the support base 901 can be controlled by adjusting the screwing amount of the adjusting screws 903a, 903b and 903c. For example, if all adjusting screws 903a, 903b and 903c are uniformly screwed, the reflection type LCD panel 91 can be moved back and forth with respect to the front plane 901a of the support base 901 (in the direction of Z axis in FIG. 17). Further, if the screwing amount of the adjusting screws 903a, 903b and 903c is different from each other, the reflection type LCD panel 91 can be turned in two predetermined direction with respect to the front plane 901a of the support base 901 (in the directions of α and β in FIG. 17).

Further, the amount of movement of the reflection type LCD panel 91 in the up- and- down direction with respect to the front plane 901a of the support base 901 (in the direction of Y axis in FIG. 17) and the amount of movement of the reflection type LCD panel 91 in the right-left direction with respect to the front plane 901a of the support base 901 (in the direction of X axis in FIG. 17) can be controlled by the other adjusting screws 904A and 904B jointed to a drive mechanism generally referred to as a parallel moving mechanism. Furthermore, the amount of turning of the reflection type LCD panel 91 in a plane parallel to the front plane 901a of the support base 901 (in the direction of γ in FIG. 17) can be controlled by the other adjusting screw 904C joined to the drive mechanism generally referred to as a turning mechanism.

As shown in FIG. 17, the position and posture of each reflection type LCD panel 91 can be freely adjusted by the position adjusting mechanism 9 having 6 degrees of freedom (X, Y, Z, α, β, γ) described above.

Next, a basic structure of the lamp case 7 will be described with reference to FIG. 19 and FIG. 20.

Figure 19:
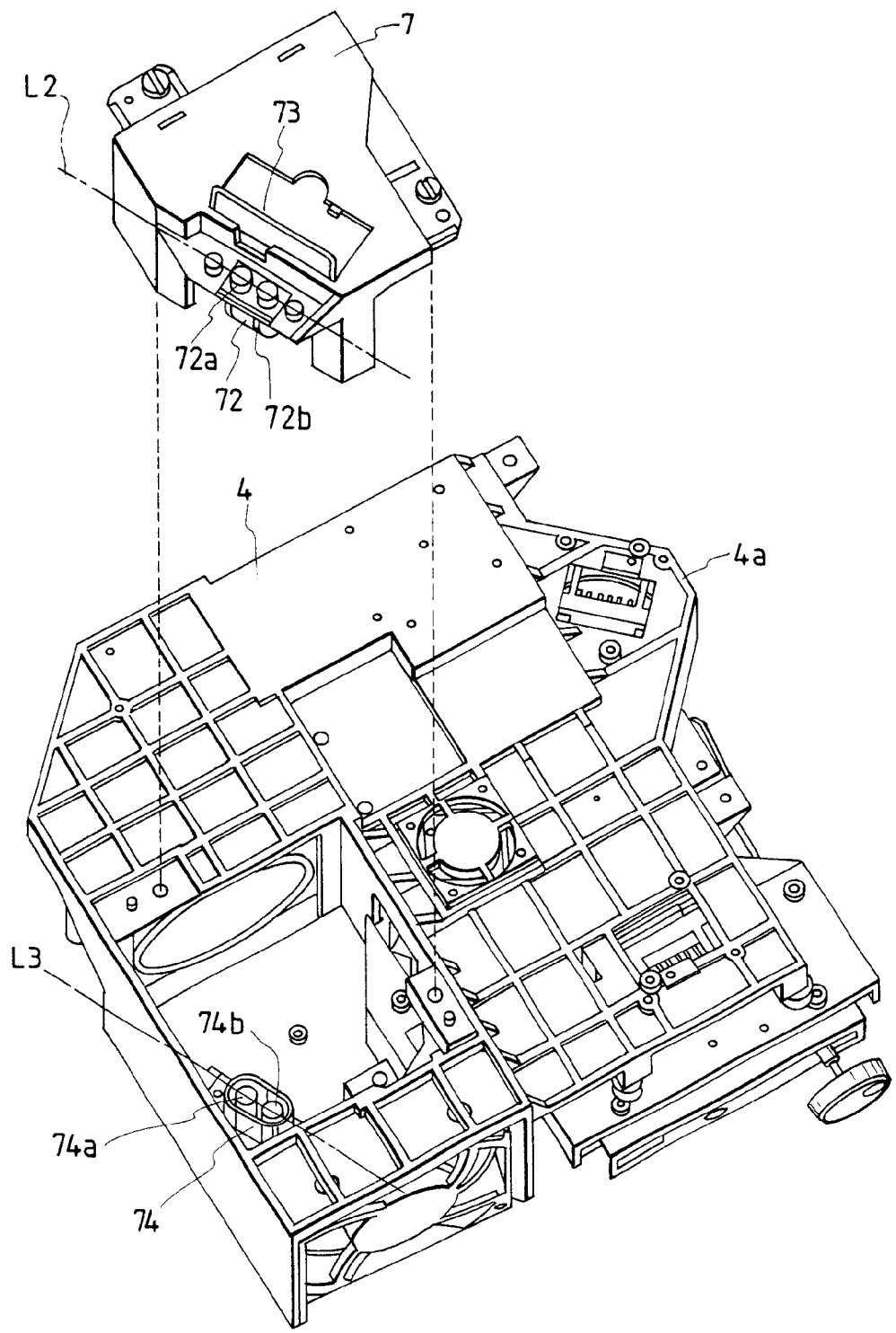
FIG. 19 illustrates a lamp house positioned to a lower unit case.
Figure 20:
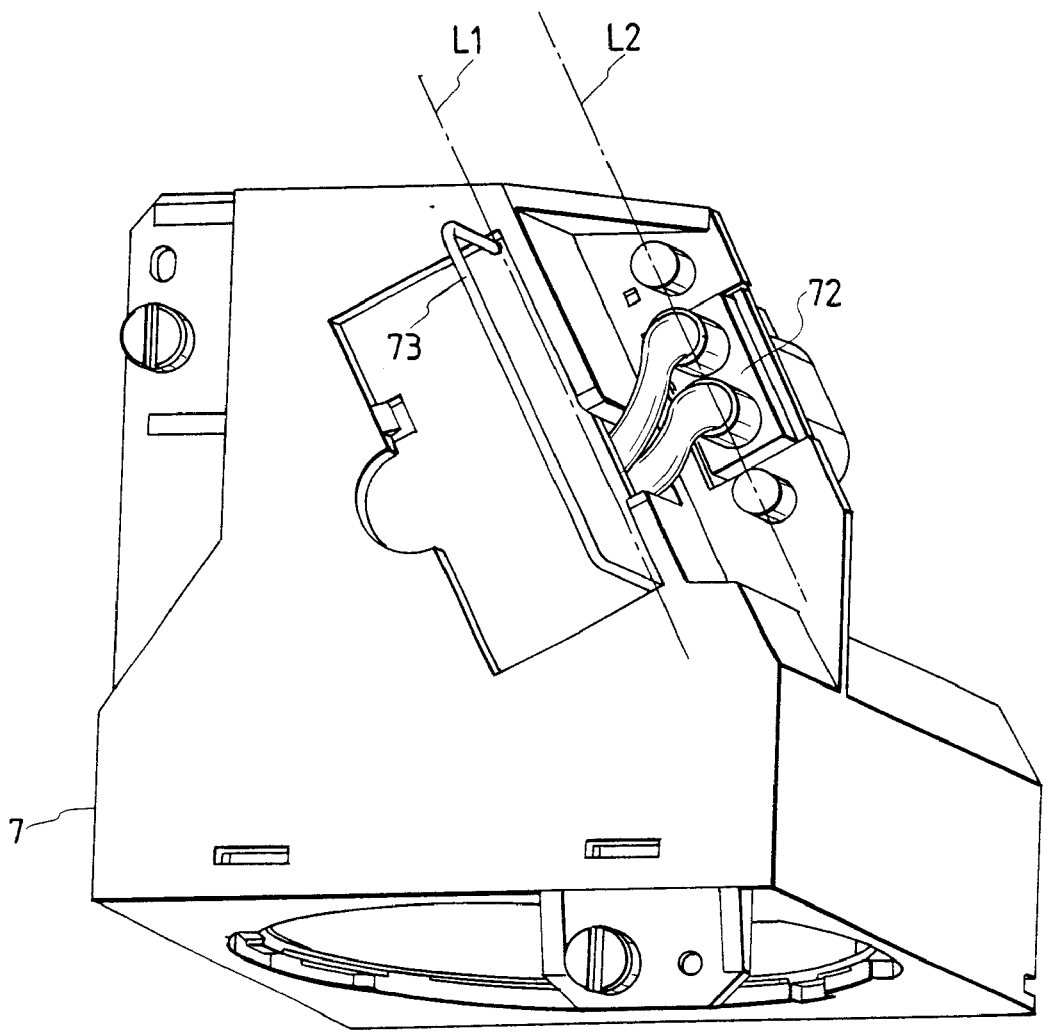
FIG. 20 is an external view of a lamp case of one embodiment according to the present invention.

As shown in FIG. 19, the lamp case 7 is assembled in the lower unit case 4a from the bottom plane side thereof. Connectors 72 and 74 are connected to each other in a state in which the lamp case 7 is assembled in the lower unit case 4a. That is, when the lamp case 7 is positioned with respect to the lower unit case 4a, the connector electrodes 72a and 72b of the connector 72 of the lamp case 7 are also positioned with respect to the connector electrodes 74a and 74b of the connector 74 of the lower unit case 4a. The lamp case 7, as shown in FIG. 20, is provided with a grip 73 along the line of two connector electrodes 72a and 72b. That is, the direction of length $L_1$ of the grip 73 is nearly parallel to the line $L_2$ of the connector electrodes 74a and 74b. Therefore, if the grip 73 is pulled in the direction orthogonal to the bottom plane of the lower unit case 4a, the connector electrodes 72a and 72b of the connector 72 of the lamp case 7 are pulled out from the connector electrodes 74a and 74b of the connector 74 of the lower unit case 4a without applying additional momentum. The grip 73 fixed to the lamp case 71 can make the force for mounting or dismounting the lamp case 71 minimum and in addition can prevent the deteriorated performance of the connectors 72 and 74 which is prone to happen when the lamp case 71 is mounted and dismounted many times.

Figure 21:
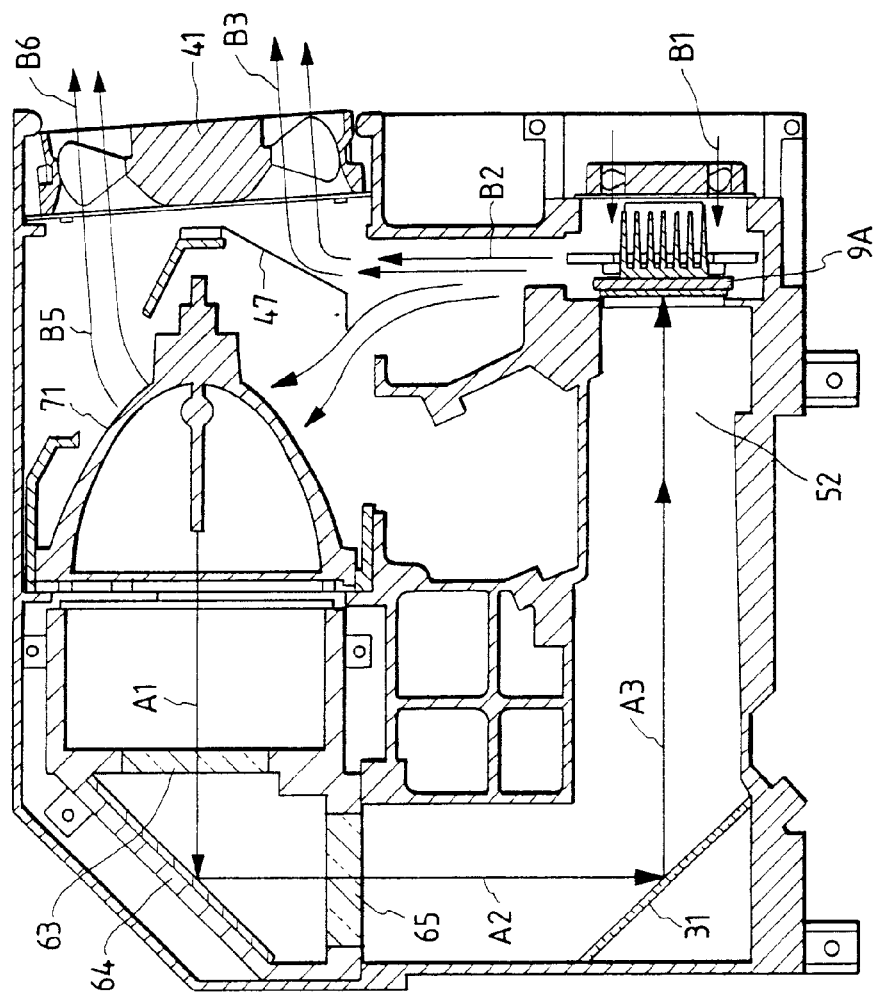
FIG. 21 is a cross sectional view of an optical unit of one embodiment according to the present invention.

FIG. 21 is a cross sectional view of the other embodiment of the optical unit according to the present invention.

The constitution shown in FIG, 21 shows a projection type image display mechanism of single panel type in which a single LCD panel is employed. Some light valve means can display an image in a plurality of colors by a single liquid crystal and the other light valve means can display the image in monochrome. If a single light valve means is employed, it is not necessary to position the images of a plurality of colors, but it is sometimes necessary to adjust the focusing position of the projected image, the inclination of the screen, or a position of the device in the up-down direction and in the right-left direction. In these cases, the light bulb means needs to be adjusted and if the same position adjusting mechanism as the embodiment is employed, it can produce the same effects as the embodiment.

In this respect, for example, (1) even if only the inside of the optical unit (that is, image display mechanism) is built in the wall plane of the building, or (2) even if only the image display mechanism is housed in a large cabinet having a transmittance type screen and an image is projected on the transmittance type screen from the opposite side thereof, the effects are obtained.

As described above, according to the present invention, the number of fans provided in the whole device can be reduced and hence the constitution of the device can be simplified and reliability can be improved. Further, noises can be reduced because the number of fans is reduced. Further, it is possible to prevent dust near the light valve and to simplify the constitution of cooling means for cooling the device at the same time. Furthermore, since the duct is provided between the illumination means and the light valve means, one or two fans for cooling both means can be selectively operated according to the operational conditions of the device and the environmental conditions.

Further, since the number of fan to be mounted for cooling the device can be selected in this constitution, the most suitable cooling performance can be realized according to the operational conditions such as the kind of employed elements, the intensity of illumination and usage.

Still further, the constitution in which an angle formed by the optical axis of the projected light pencil and the direction of exhaust is in a predetermined region can improve the environment of the audience.

Still further, in the constitution in which a plurality of structural members constituting the image display mechanism constitutes the almost hermetically closed space and in which the light incidence/reflection plane of the light valve means contacts the plurality of structural members, the LCD panel does not need to be removed when the hermetically closed space is opened or closed and hence the position adjusting means does not need to be readjusted, which can provide the image display mechanism which can be easily assembled and has good maintainability.

Still further, when the light valve means is moved by the position adjusting means, the shading elastic body sandwiched between itself and the almost hermetically closed space can realize positioning the light valve means, preventing dust and shielding light at the same time.

Still further, since the position adjusting mechanism of the LCD panel can be positioned and mounted on the image display mechanism in a single direction, it can be easily assembled and adjusted.

Still further, since the light valve means and the drive circuit means are arranged in the minimum interval, it is possible to ensure stability in the movement of the light valve means and to reduce unnecessary radiation.

In addition, in the constitution in which the grip is provided in parallel to the line of connector electrodes of the lamp case, the lamp case can be removed by the minimum force without applying momentum to the lamp case, which can improve reliability of the lamp case and the device.

Although the present invention has been described in conjunction with the embodiments thereof, it is evident that the present invention can be also used in the embodiments that are different from the embodiments and that fall within the spirit and main features of the present invention. Therefore, the embodiments are merely illustrative in all points and should not be understood in the limited scope. The scope of the present invention will be described by the appended claims. Further, all alternatives, modifications, and variations that fall within the equivalents of the appended claims are included within the present invention.

What is claimed is:

1. An image display device comprising:

illuminating means;

projecting means;

reflection type light valve means having a light incidence/reflection plane; and an almost hermetically closed space shut off from the outside air, wherein said illuminating means illuminates said reflection type light valve means and said projecting means projects light reflected by said reflection type light valve means to make a screen image, and wherein said almost hermetically closed space comprises a plurality of structural members and the light incidence/reflection plane of said reflection type light valve means contacts at least two structural members of said plurality of structural members.

2. An image display device comprising:

illuminating means;

projecting means;

reflection type light valve means having a light incidence/reflection plane;

an almost hermetically closed space shut off from the outside air; and position adjusting means for adjusting a position of said reflection type light valve means, wherein said position adjusting means are provided outside said almost hermetically closed space, and wherein said illuminating means illuminates said reflection type light valve means and said projecting means projects light reflected by said reflection type light valve means to make a screen image.

3. An image display device comprising:

illuminating means;

projecting means;

reflection type light valve means having a light incidence/reflection plane;

an almost hermetically closed space shut off from the outside air; and position adjusting means provided in a single direction nearly orthogonal to the optical axis of illumination and the optical axis of projection and for adjusting said reflection type light valve means, wherein said illuminating means illuminates said reflection type light valve means and said projecting means projects light reflected by said reflection type light valve means to make a screen image, and wherein said almost hermetically closed space comprises a plurality of structural members and the light incidence/reflection plane of said reflection type light valve means contacts at least two structural members of said plurality of structural members.

4. An image display device according to claim 2, wherein a shading elastic member is interposed between said reflection type light valve means and said almost hermetically closed space.

5. An image display device according to claim 3, wherein a shading elastic member is interposed between said reflection type light valve means and said almost hermetically closed space.

6. An image display device according to claim 2, wherein said position adjusting means comprises means for adjusting the position of said reflection type light valve means in a direction of the optical axis of illumination.

7. An image display device according to claim 3, wherein said position adjusting means comprises means for adjusting the position of said reflection type light valve means in a direction of the optical axis of illumination.

* * * * *